United States Patent [19]

Okazaki

[11] Patent Number: 5,615,932
[45] Date of Patent: Apr. 1, 1997

[54] ANTISKID BRAKING SYSTEM FOR VEHICLES

[75] Inventor: Haruki Okazaki, Hiroshima, Japan

[73] Assignee: Mazda Motor Corporation, Hiroshima-ken, Japan

[21] Appl. No.: 507,025

[22] Filed: Jul. 25, 1995

[30] Foreign Application Priority Data

Jul. 28, 1994 [JP] Japan .................................. 6-176546

[51] Int. Cl.⁶ .................................................. B60T 8/32
[52] U.S. Cl. .......................... 303/121; 303/198; 303/165
[58] Field of Search ..................................... 303/198, 140,
303/146, 147, 186, 199, 165, 164, 163,
121, 139, 161, 157, 158, 170, 171, 176,
177; 364/426.01, 426.02

[56] References Cited

U.S. PATENT DOCUMENTS 5,320,422  6/1994  Tsuyama et al. ...................... 303/141
5,325,300  6/1994  Tsuyama et al. ...................... 303/141

FOREIGN PATENT DOCUMENTS 54574   1/1993  Japan .
656019  3/1994  Japan .

*Primary Examiner*—Douglas C. Butler
*Attorney, Agent, or Firm*—Sixbey, Friedman, Leedom & Ferguson, P.C.; Gerald J. Ferguson, Jr.

[57] ABSTRACT

An antiskid braking system performs antiskid braking control, by periodically increasing and reducing hydraulic braking pressure according to a wheel speed so as to control a vehicle going into a skid, at a control gain greater in a low speed range of vehicle speeds less than a specified speed when a vehicle speed at a time of commencement of braking is low than when the vehicle speed at the time is high.

26 Claims, 19 Drawing Sheets

| | 0 | | | Vg | | | | LARGE |
|---|---|---|---|---|---|---|---|---|
| 0 | 1.0 | 1.0 | 2.0 | 2.0 | 3.0 | 3.0 | 4.0 | 4.0 | 5.0 |
| | 1.0 | 1.0 | 2.0 | 2.0 | 3.0 | 4.0 | 4.0 | 5.0 | 5.0 |
| | 1.0 | 1.0 | 2.0 | 3.0 | 3.0 | 4.0 | 4.0 | 5.0 | 5.0 |
| Vw | 1.0 | 1.0 | 2.0 | 3.0 | 4.0 | 4.0 | 5.0 | 5.0 | 5.0 |
| | 1.0 | 1.0 | 2.0 | 3.0 | 4.0 | 5.0 | 5.0 | 5.0 | 5.0 |
| | 1.0 | 1.0 | 2.0 | 4.0 | 4.0 | 5.0 | 5.0 | 5.0 | 5.0 |
| | 1.0 | 2.0 | 3.0 | 4.0 | 5.0 | 5.0 | 5.0 | 5.0 | 5.0 |
| LARGE | 1.0 | 2.0 | 3.0 | 5.0 | 5.0 | 5.0 | 5.0 | 5.0 | 5.0 |

FIG. 6

| Fak | Mul | VEHICLE SPEED: Vr | PARAMETER: M |
|---|---|---|---|
| 1 | | HIGH SPEED RANGE | HM 1 |
| | | MODERATE SPEED RANGE | HM 2 |
| | | LOW SPEED RANGE | HM 3 |
| 0 | 3 | HIGH SPEED RANGE | HM 1 |
| | | MODERATE SPEED RANGE | HM 2 |
| | | LOW SPEED RANGE | HM 3 |
| | 2 | HIGH SPEED RANGE | MM 1 |
| | | MODERATE SPEED RANGE | MM 2 |
| | | LOW SPEED RANGE | MM 3 |
| | 1 | HIGH SPEED RANGE | LM 1 |
| | | MODERATE SPEED RANGE | LM 2 |
| | | LOW SPEED RANGE | LM 3 |

FIG. 7

| PARAMETER: M | B12 | Bsg | B35 | Bsz |
|---|---|---|---|---|
| HM 1 | -1.5G | 95 % | 0G | 95 % |
| HM 2 | -1.5G | 90 % | 0G | 90 % |
| HM 3 | -1.5G | 85 % | 0G | 85 % |
| MM 1 | -1.0G | 95 % | 0G | 95 % |
| MM 2 | -1.0G | 90 % | 0G | 90 % |
| MM 3 | -1.0G | 85 % | 0G | 85 % |
| LM 1 | -0.5G | 95 % | 0G | 95 % |
| LM 2 | -0.5G | 90 % | 0G | 90 % |
| LM 3 | -0.5G | 85 % | 0G | 85 % |

FIG. 8

| Mu | Fak | θ | B12 | Bsg | B35 | Bsz |
|---|---|---|---|---|---|---|
| 1, 2 | | < 90° | B12 | Bsg | B35 | Bsz |
| | | ≥ 90° | B12 | Bsg + 5 % | B35 | Bsz + 5 % |
| 3 | 0 | < 90° | B12 | Bsg | B35 | Bsz |
| | | ≥ 90° | B12 | Bsg + 5 % | B35 | Bsz + 5 % |
| | 1 | < 90° | B12 - 1.0G | Bsg - 5 % | B35 | Bsz - 5 % |
| | | ≥ 90° | B12 - 1.0G | Bsg | B35 | Bsz |

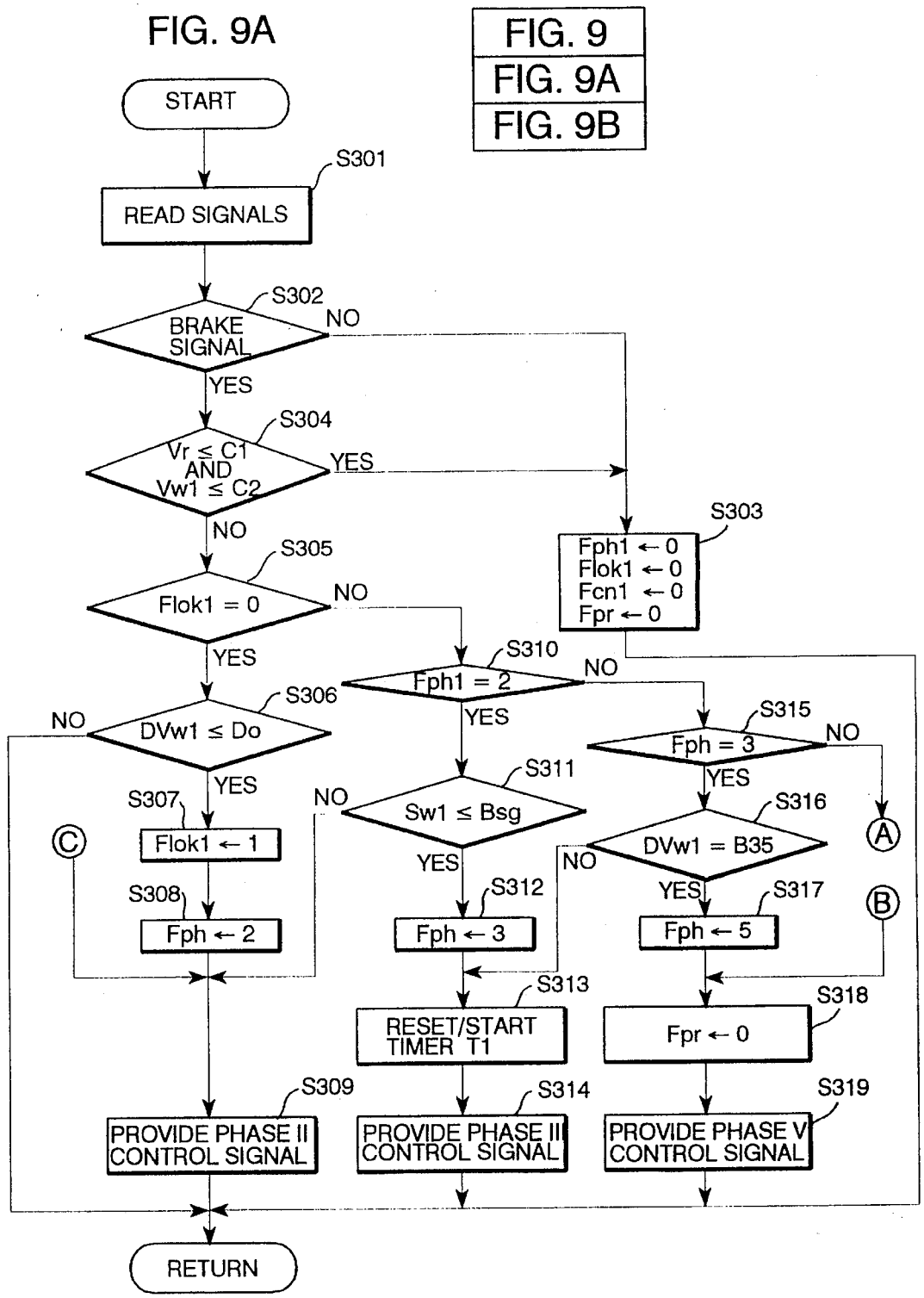

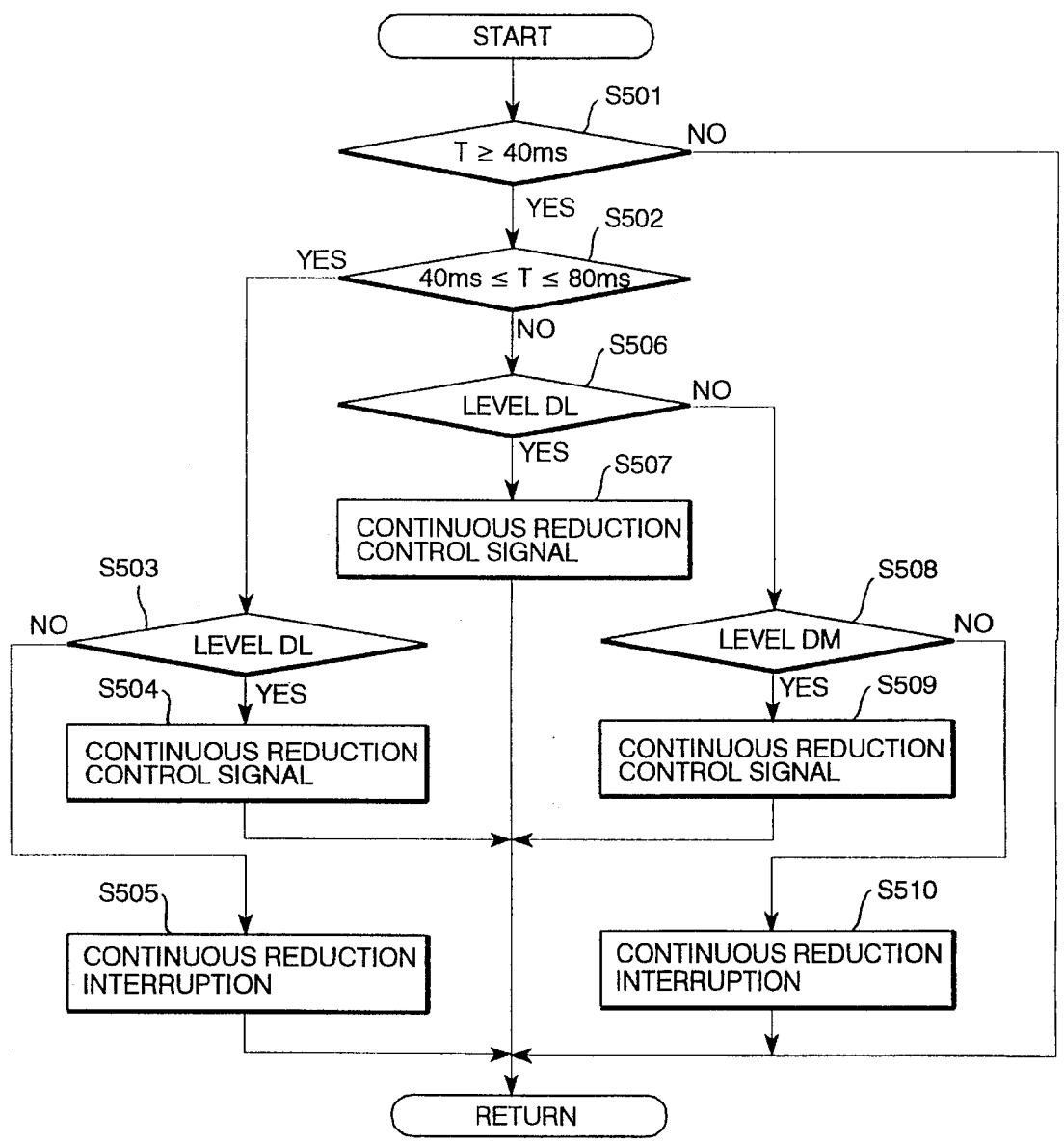

| PRESSURE REDUCTION STAGE | | PRESSURE REDUCTION START TIME | PRESSURE REDUCTION LEVEL | | | | HIGH μ |
|---|---|---|---|---|---|---|---|
| | | | DL | DM | DS | DVS | |
| 1ST CYCLE | 1ST STAGE | 0 ms. | 8 ms. | 8 ms. | 8 ms. | 8 ms. | + 8 ms |
| | 2ND STAGE | 8 ms. | 20 ms. | 16 ms. | 12 ms | 8 ms. | + 3 ms |
| | 3RD STAGE | 40 ms. | 8 ms. | 4 ms. | 6 ms. | 6 ms. | + 2 ms |
| | 4TH STAGE | 80 ms. | 10 ms. | 6 ms. | 2 ms. | 6 ms. | + 2 ms |
| | 5TH STAGE | 120 ms. | 20 ms. | 16 ms. | 8 ms. | 4 ms. | + 2 ms |
| AFTER 1ST CYCLE | 1ST STAGE | 0 ms. | 20 ms. | 16 ms. | 12 ms | 8 ms. | + 3 ms |
| | 2ND STAGE | 40 ms. | 8 ms. | 4 ms. | 6 ms. | 6 ms. | + 2 ms |
| | 3RD STAGE | 80 ms. | 10 ms. | 6 ms. | 2 ms. | 6 ms. | + 2 ms |
| | 4TH STAGE | 120 ms. | 20 ms. | 16 ms. | 8 ms. | 4 ms. | + 2 ms |

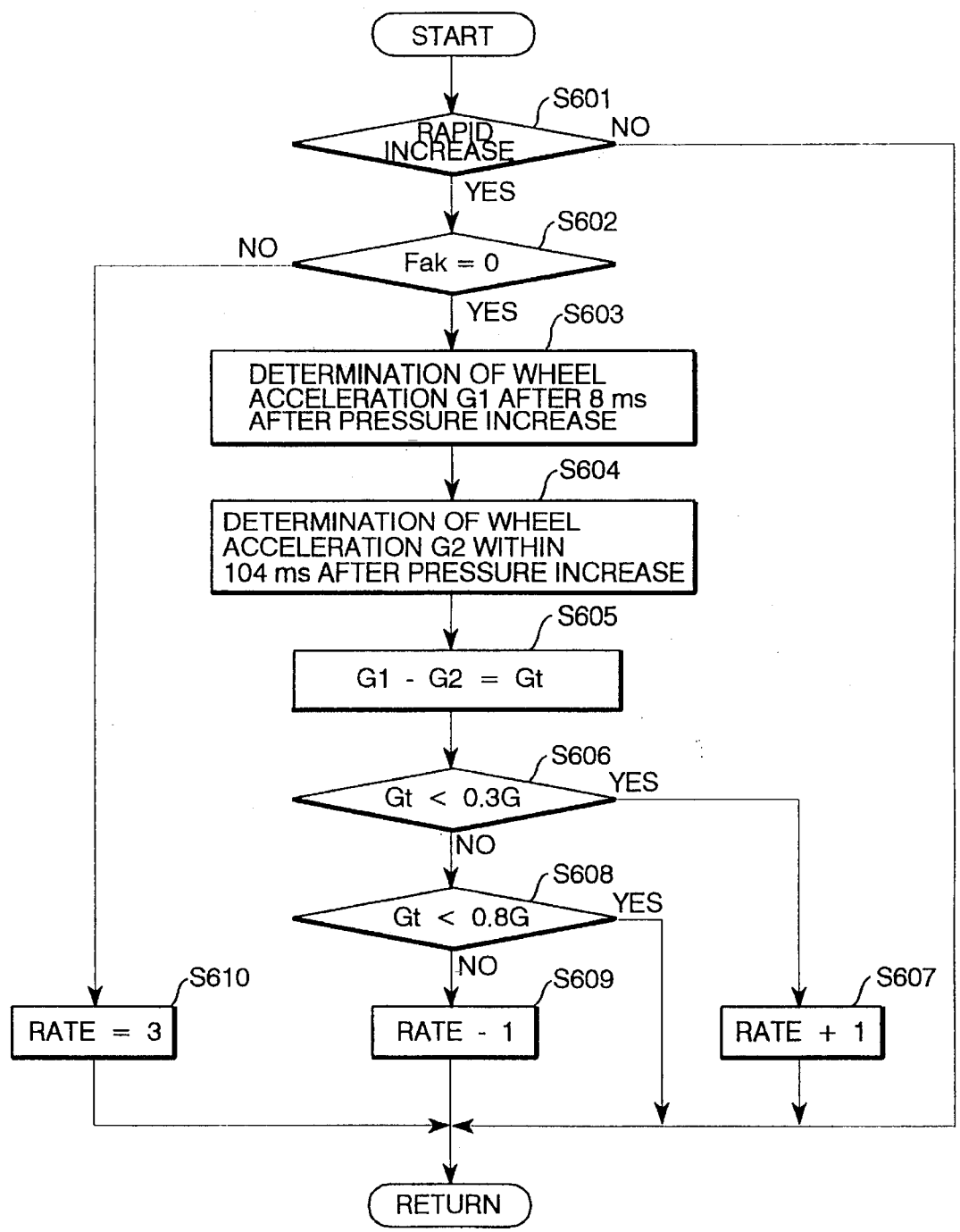

FIG. 16

| Mu | 1 | 2 | 3 |
|---|---|---|---|
| 1 | 6 ms | 12 ms | 30 ms |
| 2 | 12 ms | 16 ms | 30 ms |
| 3 | 16 ms | 18 ms | 30 ms |
| 4 | 30 ms | 30 ms | 30 ms |

FIG. 18

| PARAMETER: M | | B12 | Bsg | B35 | Bsz |
|---|---|---|---|---|---|
| HM | 1 | -1.5 G | 97 % | 0 G | 95 % |
| HM | 2 | -1.5 G | 92 % | 0 G | 90 % |
| HM | 3 | -1.5 G | 87 % | 0 G | 85 % |
| MM | 1 | -1.0 G | 97 % | 0 G | 95 % |
| MM | 2 | -1.0 G | 92 % | 0 G | 90 % |
| MM | 3 | -1.0 G | 87 % | 0 G | 85 % |
| LM | 1 | -0.5 G | 97 % | 0 G | 95 % |
| LM | 2 | -0.5 G | 92 % | 0 G | 90 % |
| LM | 3 | -0.5 G | 87 % | 0 G | 85 % |

FIG. 19

| | PRESSURE REDUCTION STAGE | PRESSURE REDUCTION START TIME | PRESSURE REDUCTION LEVEL | | | | HIGH μ |
|---|---|---|---|---|---|---|---|
| | | | DL | DM | DS | DVS | |
| 1ST CYCLE | 1ST STAGE | 0 ms. | 8 ms. | 8 ms. | 8 ms. | 8 ms. | + 8 ms |
| | 2ND STAGE | 8 ms. | 20 ms. | 16 ms. | 12 ms | 8 ms. | + 3 ms |
| | 3RD STAGE | 40 ms. | 8 ms. | 4 ms. | 6 ms. | 6 ms. | + 2 ms |
| | 4TH STAGE | 80 ms. | 10 ms. | 6 ms. | 2 ms. | 6 ms. | + 2 ms |
| | 5TH STAGE | 120 ms. | 20 ms. | 16 ms. | 8 ms. | 4 ms. | + 2 ms |
| AFTER 1ST CYCLE | 1ST STAGE | 0 ms. | 22 ms | 18 ms | 14 ms | 10 ms | + 3 ms |
| | 2ND STAGE | 40 ms. | 10 ms | 6 ms | 2 ms | 2 ms | + 2 ms |
| | 3RD STAGE | 80 ms. | 12 ms | 8 ms | 4 ms | 2 ms | + 2 ms |
| | 4TH STAGE | 120 ms. | 22 ms | 18 ms | 10 ms | 6 ms | + 2 ms |

FIG. 20

| Mu | 1 | 2 | 3 |
|---|---|---|---|
| 1 | 8 ms | 14 ms | 32 ms |
| 2 | 14 ms | 18 ms | 32 ms |
| 3 | 18 ms | 20 ms | 32 ms |
| 4 | 32 ms | 32 ms | 32 ms |

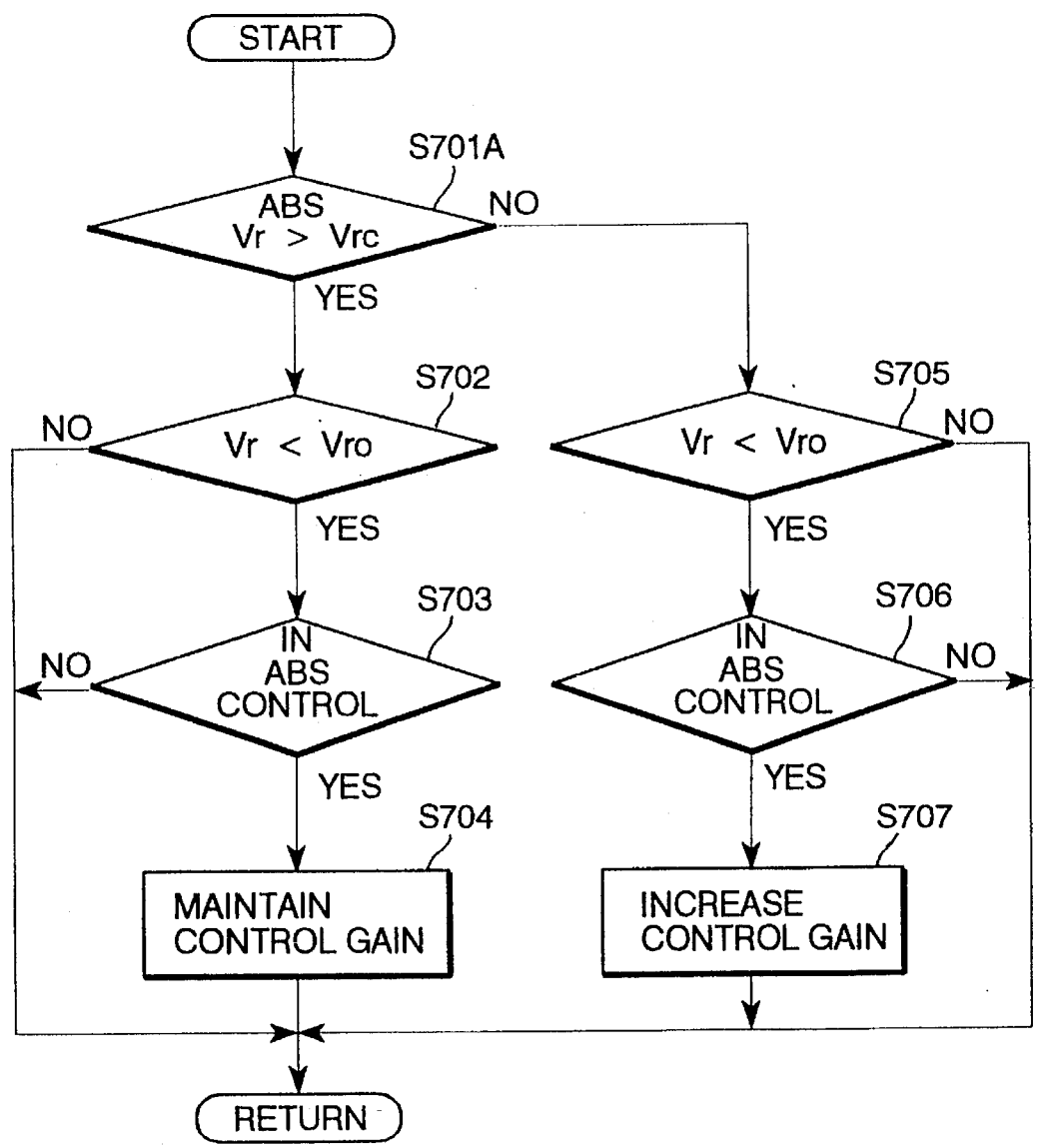

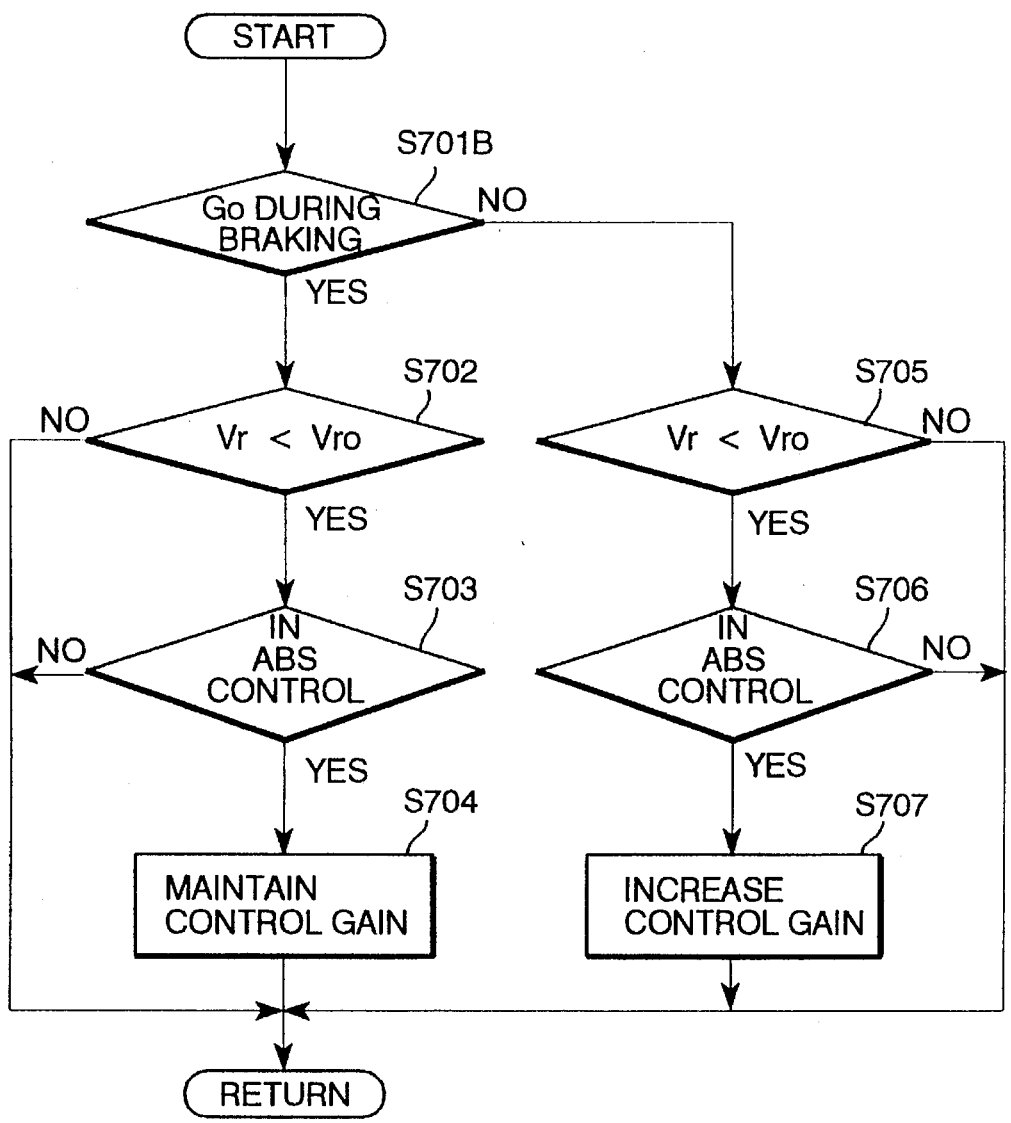

ANTISKID BRAKING SYSTEM FOR VEHICLES

BACKGROUND OF THE INVENTION

1. Field of the invention

The resent invention relates to an antiskid braking system for preventing a skid of a car during braking.

2. Description of Related Art

In order to prevent wheels from locking due to excessive hydraulic braking pressure during braking so as to assure reliable steering and braking, there have been widely used various kinds of antiskid braking systems. Such an antiskid braking system cooperates with a control unit which causes an electronically controlled valve provided in a hydraulic braking pressure control system to, on one hand, reduce hydraulic braking pressure when wheels are on the verge of locking and, on the other hand, intensify the hydraulic braking pressure with a gradual growth in wheel speed resulting from a decline in the hydraulic braking pressure. The control unit calculates a slippage rate from a vehicle speed, which is represented by the greatest one of speeds of the wheels detected by, for instance, wheel speed sensors, respectively, and the wheel speeds and commences reducing hydraulic braking pressure at a time the slippage rate reaches a target slippage rate which is referred to as a threshold slippage rate for pressure reduction. When the control of hydraulic braking pressure in this manner, which is called an antiskid braking control, is continually performed until the car stops, the wheels are prevented from locking and, as a result, prevent the car from going into a skid, so as to assure the stability of steering and enable to bring the car to a halt in a short braking distance.

Much attention has been given to various approaches relating to braking techniques by means of antiskid braking systems which include the improving of the stability of steering and reducing braking distance. One such effort is that described in Japanese Unexamined Patent Publications Nos. 5-4574 and 6- 56019. The antiskid braking system is to alter the pattern of operation of the antiskid braking system between high speed driving and low speed driving.

Incidentally, upon braking a car, a load shifts toward the front wheels. Considering that a car traveling at a high speed of, for instance, approximately 100 Km/h is braked and brought into a halt in a short time, the car stops with a large load shifted to and imparted to the front wheels, resulting in that the front wheels still receive reaction from a road surface even when the car looses speed. Accordingly, when a car equipped with an antiskid braking system enters into antiskid braking control during braking, the front wheels receive heavy reaction from the road surface even at a low vehicle speed in a range of speeds less than, for instance, 20 Km/h, the car causes a prompt revival of wheel speed even when negotiating hydraulic braking pressure reduction leniently in the low speed range.

On the other hand, when the car travelling at a moderate vehicle speed of, for instance, 50 Km/h on a road of the same surface conditions as above is brought into a halt, the reaction imparted to the front wheels is less heavy as compared with braking the car travelling at a high speed. This leads to a delayed revival of wheel speed unless negotiating hydraulic braking pressure reduction promptly in the low speed range.

SUMMARY OF THE INVENTION

It is an object of the present invention to provide an antiskid braking system which yields steady drivability and optimum braking force regardless of vehicle speeds at a time of commencement of braking.

The above object of the present invention is achieved by providing an antiskid braking system for performing antiskid braking control by periodically increasing and reducing hydraulic braking pressure according to a wheel speed during braking so as to control a vehicle going into a skid. The control system performers the antiskid braking control at a control gain which is greater in a low speed range of vehicle speeds less than a specified speed, for instance 20 km/h, when a vehicle speed, presumed based on wheel speeds, at a time of commencement of braking detected by a brake sensor is low, for instance less than 80 km/h, as compared to a vehicle speed at the time of commencement of braking is high or greater than 80 km/h. The hydraulic braking pressure is increased or decreased by regulating a pulse width for pulsing an electronic valve.

Specifically, the control system changes the control gain to be greater when a vehicle speed at a time of commencement of braking is lower than a specified speed as compared to when a vehicle speed at the time of commencement of braking is higher than the specified speed. The control system may calculates a slippage rate based on wheel speeds and a vehicle speed and causes a reduction of hydraulic braking pressure in the antiskid braking control when the slippage rate is above a target slippage rate. In such a case the control gain may be changed to be greater by changing the target slippage rate to be lower. Alternatively, the control system may changes the control gain by varying the pulse width.

The control system may change the control gain to be greater when a vehicle speed at a time of commencement of antiskid braking control is low as compared to when a vehicle speed at the time is high. Further, the control system may changes the control gain to be greater in the low speed range of vehicle speeds less than the specified speed when deceleration of the vehicle is lower than a specified deceleration, for instance 0.7 G, as compared to when the deceleration is higher than the specified deceleration.

Otherwise, the control system may change the control gain to be greater in a low speed range of vehicle speeds less than a specified speed when a load shifting to front wheels during braking is low as compared to when the presumed load is high. The load is presumed based on a vehicle speed at a time of commencement of braking, or otherwise on deceleration of the vehicle during braking or at a time of commencement of the antiskid braking control.

In the antiskid braking control, a slippage rate or an anti-slippage rate of a specific wheel is calculated based on a speed of the wheel and a vehicle speed for which the highest speed of four wheels is substituted. The slippage rate, or otherwise the anti-slippage rate, is compared with a target slippage rate or a target anti-slippage rate as a threshold for determining whether hydraulic braking pressure is to be reduced during antiskid braking. The control of reducing the hydraulic braking pressure is commenced from a time the slippage rate rises above the target slippage rate or from a time the anti-slippage rate falls below the target anti-slippage rate. Changing the slippage rate smaller or the anti-slippage rate larger advances the commencement of the control of reducing the hydraulic braking pressure, providing an increase in gain of the control of pressure reduction during antiskid braking.

The antiskid braking system practically includes an electronically controlled valve which is pulsed to open for a period of time according to a pulse width and allows the hydraulic braking pressure to rise or drop according to the pulse width. Changing the pulse width wider provides an increase in gain of the control of pressure reduction during antiskid braking.

With the antiskid braking system of the invention, the antiskid braking control is performed at a control gain in a low range of vehicle speeds less than, for instance, 20 km/h, greater when the vehicle speed is presumed to be low, for instance 50 km/h, at the commencement of braking than when it is presumed to be high, for instance 100 km/h, at the commencement of braking. This change in control gain causes quick braking pressure reduction suitably to yield a speedy revival of wheel speed even though there is less reaction of a road surface against the wheel, preventing the wheel to lock. In the case where the vehicle speed at the commencement of braking is high such as 100 km/h, the vehicle is brought into a halt with a load concentrated on the front wheels, so that the road surface still imparts strong reaction against the front wheels even when the vehicle speed declines into a range of speeds less than a specified low speed, for instance 20 km/h, bringing the vehicle into a steady halt by means of the antiskid braking control performed at an unchanged control gain. Viewing this in a different light, there is yielded steady drivability and reliable braking force. Together, keeping the control gain of the antiskid braking control unchanged in the low speed range secures the presumption of vehicle speed, providing improvement of the antiskid braking control.

BRIEF DESCRIPTION OF THE DRAWINGS

The above and other objects and features of the present invention will be clearly understood from the following description with respect to a preferred embodiment thereof when considered in conjunction with the accompanying drawings, in which same reference numerals having used throughout the drawings denote the same or similar elements or functions and wherein:

FIG. 6 is a driving condition parameter table;

FIG. 7 is a threshold value table;

FIG. 8 is a threshold value correction table;

FIGS. 9, 9A and 9B are flow charts illustrating a sequence routine of providing a brake control signal;

FIGS. 10, 10A and 10B are flow charts illustrating a sequence subroutine of pressure reduction control;

FIG. 11 is a flow chart illustrating a sequence subroutine of continuous pressure reduction control;

FIG. 15 is a flow chart illustrating a sequence routine of control level determination;

FIG. 16 is a table showing duty rates in the form of time for operating a valve according to control level and road surface friction level;

FIG. 18 is a threshold value table after control gain alteration;

FIG. 19 is a table showing quantitative pressure reduction at various pressure reduction levels for first to fifth stages of pressure reduction after control gain alteration;

FIG. 20 is a table showing duty rates in the form of time for operating a valve according to control level and road surface friction level after control gain alteration;

FIG. 21 is a flow chart illustrating a variation of the sequence routine of control gain alteration; and FIG. 22 is a flow chart illustrating another variation of the sequence routine of control gain alteration.

DETAILED DESCRIPTION OF THE PREFERRED EMBODIMENTS

Because hydraulic braking systems are well known, the present description will be directed in particular to elements and apparatuses forming part of, or cooperating directly with, in accordance with the present invention. It is to be understood that elements or apparatuses not specifically shown or described can take various forms well known to those skilled in the art. In the following description, arabic numerals 1–4 following various control factors indicate physical values inherent to the wheels 1–4, respectively.

Figure 1:
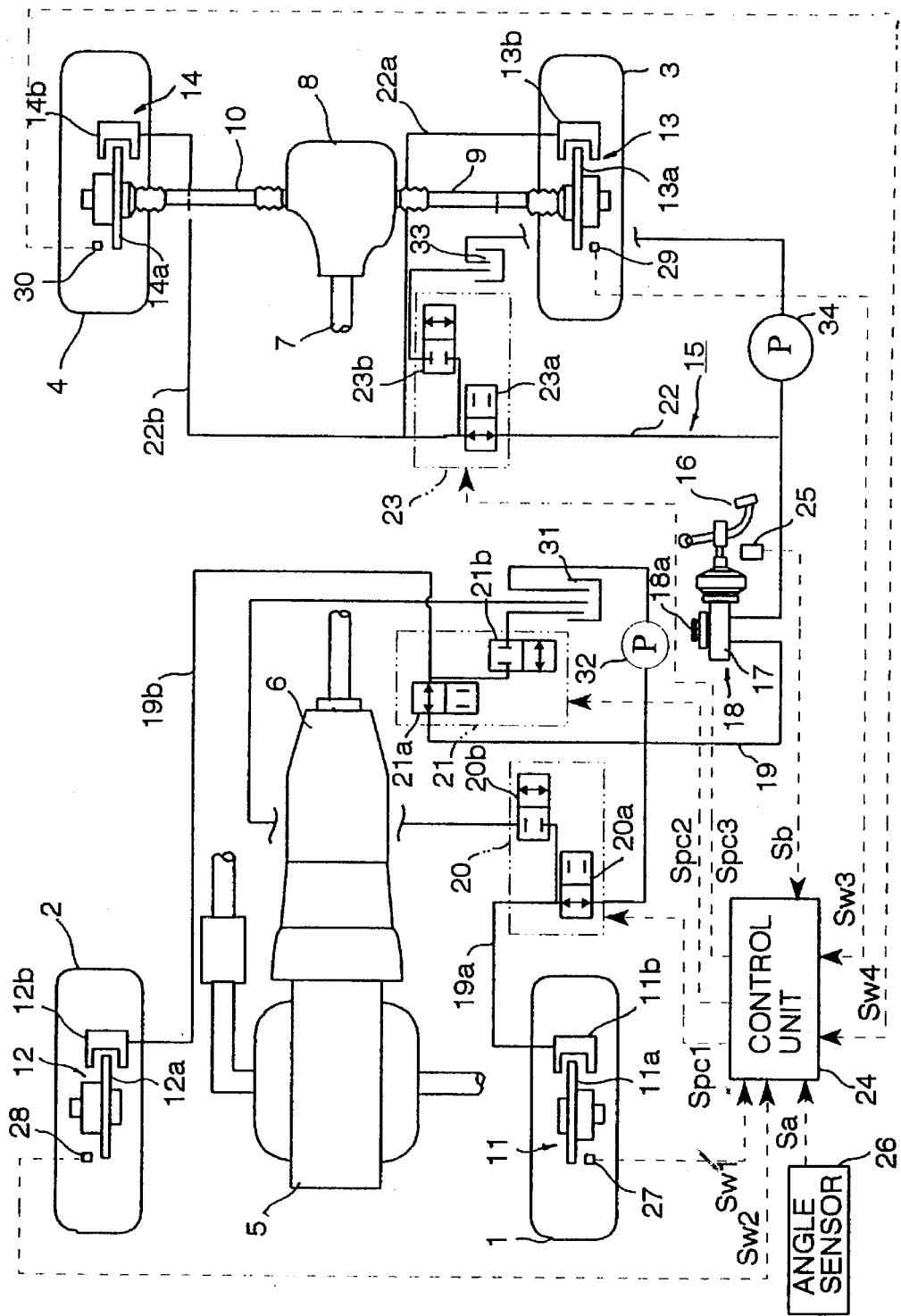
FIG. 1 is a schematic illustration of an antiskid braking system in accordance with an embodiment of the present invention which is incorporated in a front engine-rear drive vehicle.

Referring now to the drawings in detail, and in particular, to FIG. 1, a front engine-rear drive vehicle equipped with an antiskid braking system in accordance with an embodiment of the present invention is shown, which has front driven wheels 1 and 2 and rear drive wheels 3 and 4. The engine output torque is transmitted from an engine 5, disposed in an front engine compartment, to the rear drive wheels 3 and 4 through rear axles 9 and 10, respectively, an automatic transmission 6 via a propeller shaft 7 and a differential 8. An automatic transmission 6.

Front and rear wheels 1–4 are provided with brake assemblies 11–14, respectively, actuated by means of a brake control system 15 schematically shown. These brake assemblies 11–14 may take any known type such as including brake disks 11a–14a secured to the wheels 1–4, respectively, and calipers 11b–14b which shove the brake disks 11a–14a, respectively, so as to brake the respective wheels 1–4.

Brake control system 15 cooperates with a hydraulic braking pressure control circuit (partly shown) which basically includes an intensifying accumulator 17, which in turn intensifies a force applied to a brake pedal 16, and a master cylinder 18 linked with the brake pedal 25 for developing a hydraulic pressure according to the intensified force. The master cylinder pressure is transmitted to wheel cylinders (not shown) provided in association with the calipers 11b and 12b of the front brake assemblies 11 and 12 through braking pressure lines 19a and 19b branching off from a front main pressure line 19, respectively. These braking pressure lines 19a and 19b are provided with valve units 20 and 21, respectively. Each valve unit 20, 21 comprises an electronic switch valve 20a, 21a and an electronic relief valve 20b, 21b. Similarly, the master cylinder pressure is also transmitted to wheel cylinders (not shown) provided in association with the calipers 13b and 14b of the rear brake assemblies 13 and 14 through braking pressure lines 22a and 22b branching off from a rear main pressure line 22, respectively. The rear main pressure line 22 is provided with a valve unit 23 comprising an electronic switch valve 23a and an electronic relief valve 23b.

Brake oil discharged from the relief valves 20b and 21b of the valve units 20 and 21 (which are hereafter referred to as first and second valve units, respectively), respectively, is reserved in a front oil reservoir 31 and is pumped and delivered by an oil pump 32 to the front main pressure line 19. The brake oil in the front oil reservoir 31 is returned into an oil reservoir 18a provided in association with the master cylinder 18 through a drain line (not shown). Further, the brake oil discharged from the relief valve 23b of the valve unit 23 (which is hereafter referred to as a third valve unit) is reserved in a rear oil reservoir 33 and is pumped and delivered by an oil pump 34 to the rear main pressure line 22. The brake oil in the rear oil reservoir 33 is returned into the oil reservoir 18a through a drain line (not shown).

Brake control system 15 includes a control unit 24, mainly comprising a microcomputer, for controlling operation of the first to third brake systems, namely front right, front left and rear brake systems. For the control, the control unit 24 receives various signals, such as a brake application signal Sb from a brake switch or sensor 25 during operation of the brake pedal 25, a steering angle signal Sa from an angle sensor 26 provided in association with a steering wheel (not shown), and wheel speed signals SVw1–SVw4 from speed sensors 27–30 provided in association with the wheels 1–4, respectively. According to these signals, the control unit 24 provides for the first to third valve units 20, 21 and 23 braking pressure control signals Spc1–Spc4 so as to perform slippage control of the wheels 1–4, thereby achieving the antiskid braking control simultaneously but independently in association with the first to third brake systems. Together, the control unit 24 controls valves of the first to third valve units 20, 21 and 23 to open and close their switch valves 20a, 21a and 23a and relief valves 20b, 21b and 23b so as to apply braking force to the wheels 1–4 according to lock conditions of the wheels 1–4.

Under conditions where antiskid braking control is not effect, the control unit 24 provides braking pressure control signals Spc1–Spc4 so as to keep, on one hand, switch valves 20a, 21a and 23a open and, on the other hand, the relief valves 20b, 21b and 23b closed, delivering hydraulic braking pressure which is developed by the master cylinder 18 according to a depressed stroke of the brake pedal 16 to the wheel cylinders of the wheels 1–4 through the front and rear main pressure lines 19 and 22. The braking force, which is proportional to the hydraulic braking pressure, is directly applied to each wheel 1–4.

Control unit 24 performs operations or calculations of acceleration AVw1–AVw4 and deceleration AVw1–DVw4 of the wheels on the basis of wheel speeds Vw1–Vw4 represented by wheel speed signals SVw1–SVw4 from the speed sensors 27–30, respectively. Acceleration AVw or deceleration DVw of each wheel is expressed in the form of acceleration or deceleration of gravity into which the result of a division of the difference of a current wheel speed Vw from the preceding wheel speed Vw by a sampling period $\Delta t$, for instance 8 ms, is converted. Together, the control unit 24 performs a judgement as to whether a road surface on which the vehicle is traveling is in good condition or in bad condition. In this instance, in order to make the road condition judgement, the number of times that acceleration or deceleration of the wheel for each of the first to third brake systems exceeds a threshold value in a predetermined period of time is counted. When the number of times is less than a specified number of times, the road surface is determined to be in good condition and a road condition flag Fak is down or reset to a state of "0." On the other hand, when the number of times is greater than the specified number of times, the road surface is determined to be in bad condition and the road condition flag Fak is up or set to a state of "1." For the third brake system, drive wheel speed Vw and acceleration or deceleration are represented by those of either one of the rear drive wheels 3 and 4. Specifically, in consideration of errors of speed detection of the speed sensors 29 and 30 due to bad roads, either one of the rear drive wheels whose speed Vw is higher than that of the other for the road condition judgement during slippage of the rear drive wheels 3 and 4. Together, the control unit 24 performs a calculation or estimation of vehicle speed Vr and a calculation of road surface friction coefficient B with regard to the wheel of each brake system at regular minute intervals.

On the basis of these vehicle speed Vr and wheel speed Vw of each of both front wheels 1 and 2 and either one of the rear wheels 3 and 4, a wheel slippage rate Sw is calculated for each brake system. In this instance, an anti-slippage rate Sw is defined as a percentage of wheel speed Vw relative to vehicle speed Vr and used to indicate a tendency for the wheel to cause slippage—the larger the difference of wheel speed Vw from vehicle speed Vr, the stronger the wheel slippage tends to occur. The anti-slippage rate Sw is defined by the following equation.

$$Sw = (Vw/Vr) \cdot 100\%$$

This equation specifies that the anti-slippage rate Sw declines with an increase in the difference of wheel speed Vw from vehicle speed Vr.

Subsequently, in order to control the first to third brake systems, various threshold values are established and used to perform processing of wheel lock judgement, control phase determination and cascade lock judgement. There are established for the antiskid braking control six control phases according to driving conditions, namely a control-free phase 0 (zero) where the antiskid braking control is not caused, a pressure increasing phase I where hydraulic braking pressure is increased, an increased pressure holding phase II where the increased hydraulic braking pressure is held unchanged, a pressure reducing phase III where the hydraulic braking pressure is reduced, an abrupt pressure reducing phase IV where the hydraulic braking pressure is reduced abruptly, and a reduced pressure holding phase V where the reduced hydraulic braking pressure is held unchanged. For the control phase judgement, driving conditions are defined by parameters including driving condition threshold values, acceleration or deceleration of a wheel and an anti-slippage rate Sw of the wheel. Together, in the control, lock states of a wheel are indicated by three flags, i.e. a lock flag Flok, a lock continuance flag Fcn, a cascade lock flag Fcs and a phase flag Fph.

In the wheel lock judgement, when both vehicle speed Vr and wheel speed Vw satisfy specified conditions, for instance they are less than specified speeds 5 Km/h and 7.5 Km/h, respectively, these flags Fen and Flok are down or reset to a state of "0". On the other hand, when these vehicle speed Vr and wheel speed Vw do not satisfy the specified conditions, the lock flag Flok is up or set to a state of "1" only when a specified condition of the wheel, for instance deceleration of 3 G, is created. However, if the lock flag Flok has been up though the vehicle speed Vr and wheel speed Vw does not satisfy the specified conditions, the lock continuance flag Fcn is set to a state of "1" only when the control is in the reduced pressure holding phase V, which is indicated by the phase flag Fph set to 5, and the anti-slippage rate Sw is larger than an anti-slippage threshold value Bsz for 5-1 ant-slippage which will be described later. This wheel lock judgement is performed for the first to third brake systems, independently. The cascade lock judgement is made to detect a cascade lock, which refers to a wheel lock continually occur in a short time, for the reason that even a low level of hydraulic braking pressure often cause a lock of the wheel on a low frictional road, in particular, such as on an icy road. The cascade lock flag Fcs is up or set to a state of "1" when specified driving conditions easily allowing a cascade lock are developed. Based on these judgement and determination, the control unit 24 provides pressure control signals in conformity with the control phases indicated by the phase flag Fph to the first to third valve units 20, 21 and 23, respectively, so as to increase, decrease or hold the hydraulic braking pressure on the front and rear braking pressure lines 19a, 19b, 22a and 22b, respectively.

In determination of the level of road surface friction Mu1 in association with, for instance, the front wheel 1, a road surface friction coefficient µ is calculated based on a wheel speed Vw1 and acceleration Vg1 of the front wheel 1. In order to obtain acceleration Vg, a 100 ms timer and a 500 ms timer are used. That is, within a period of 500 ms after the commencement of acceleration in which the acceleration Vg is not sufficiently large, a change in the wheel speed Vw1 for a period of 100 ms is sampled every period of 100 ms. Based on the sampled change of the current wheel speed Vw1(i) from the wheel speed Vw1(i–100) at a time 100 ms earlier from the present time (i), the acceleration Vg1 is obtained from the following equation:

$$Vg1 = K1 \cdot [Vw1(i) - Vw1(i-100)]$$

After the lapse of 500 ms necessary for the front wheel 1 to get accelerated sufficiently, a change in the wheel speed Vw1 for a period of 500 ms is sampled every period of 100 ms. In this case, based on the sampled change of the current wheel speed Vw1(i) from the wheel speed Vw1(i–500) at a time 500 ms earlier from the present time (i), the acceleration Vg1 is obtained from the following equation:

$$Vg1 = K2 \cdot [Vw1(i) - Vw1(i-500)]$$

In the above equations, K1 and K2 are invariable.

Figures 2, 4:
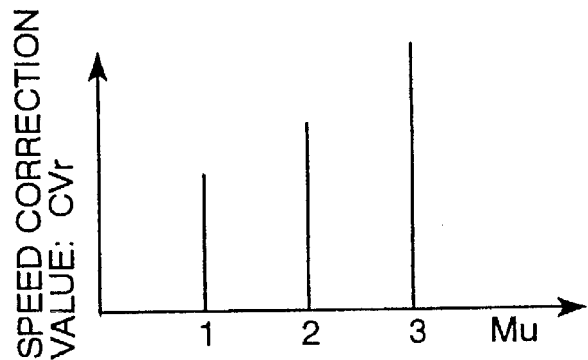
FIG. 2 is a friction coefficient table defining road surface friction coefficients according to wheel speed and wheel acceleration.
FIG. 4 is a vehicle speed correction factor table.

A road surface friction coefficient µ is found by looking up or searching a friction coefficient table, as shown in FIG. 2, containing applicable road surface friction coefficients µ and calculated by three dimensional interpolation according to the wheel speed Vw1 and wheel acceleration Vg1. As shown in FIG. 2, the friction coefficient table defines road surface friction coefficients µ in five levels from 1.0 to 5.0 according to wheel speeds Vw1 and wheel acceleration Vg.

Road surfaces are divided into three levels of friction conditions, namely a low road surface friction level (Mu=1) of road surfaces which have friction coefficients µ between 1.0 and 2.5, a moderate road surface friction level (Mu=2) of road surfaces which have road surface friction coefficients µ between 2.5 and 3.5 and a high road surface friction level (Mu=3) of road surfaces which have road surface friction coefficients µ between 3.5 and 5.0.

Although a road surface friction coefficient µ is obtained in the same manner as described above for the front wheels 1 and 2 of the first and second brake systems, a road surface friction coefficient µ for the rear wheel 3 of the third brake system is assumed to be equal to either one of those for the front wheels 1 and 2 which is smaller than the other. In place of calculating these road surface friction coefficient µ based on vehicle speed Vr and wheel speed Vw, special sensors may be provided so as to detect road surface friction coefficient µ for the wheels 1–3 of the first to third brake systems directly.

The operation of the antiskid braking system depicted FIG. 1 will be best understood by reviewing FIGS. 3, 5, 9, 10, 11 and 15, which are flow charts illustrating various sequence routines and subroutines.

Figure 3:
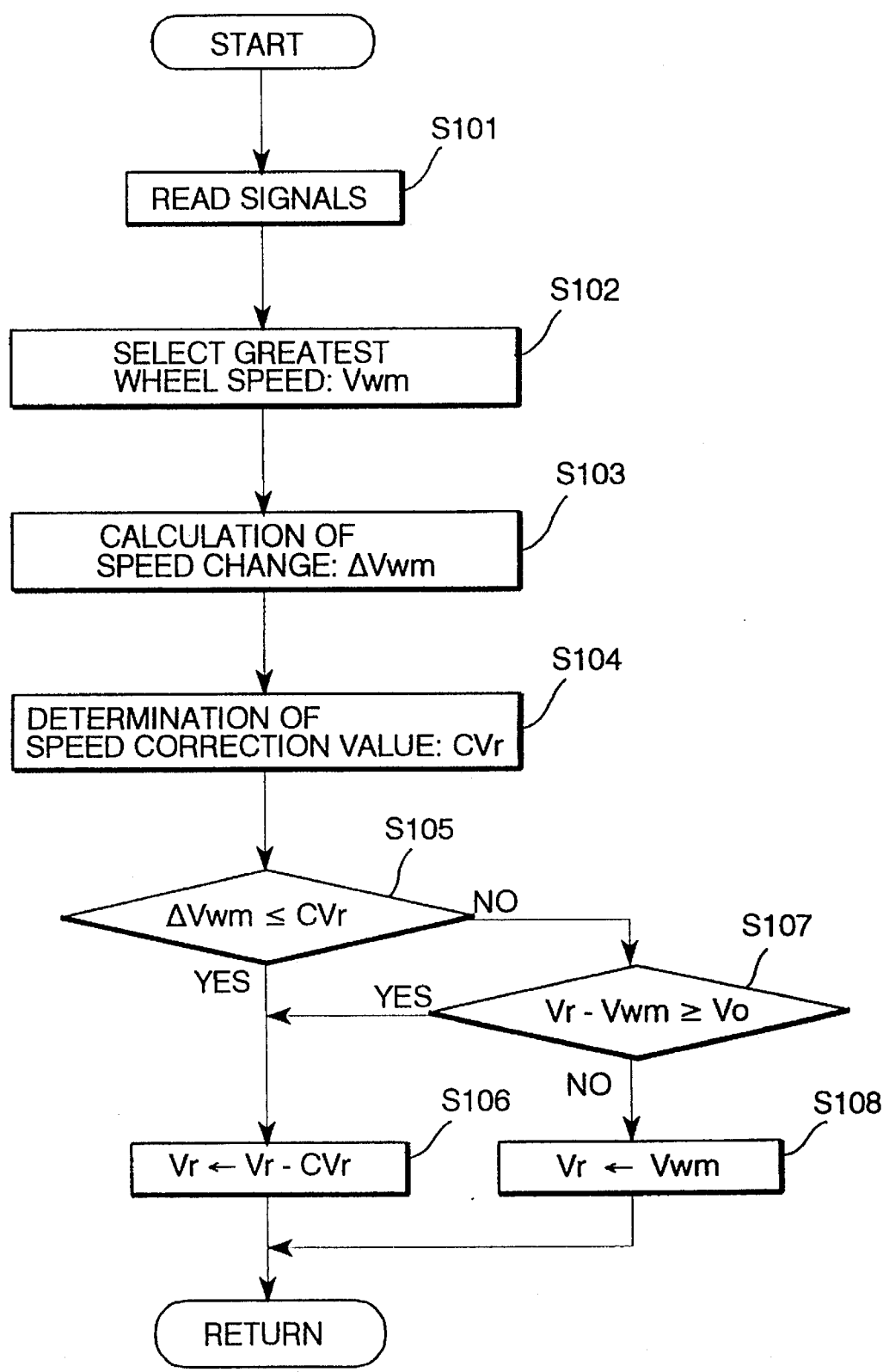
FIG. 3 is a flow chart illustrating a sequence routine of vehicle speed presumption.

Referring to FIG. 3, which is a flow chart illustrating the sequence routine of vehicle speed presumption, the vehicle speed presumption routine commences and control proceeds directly to step S101 where signals indicative of various data, including wheel speeds Vw1–Vw4, road surface friction levels Mu1–Mu3, a preceding vehicle speed Vr, are read in. After taking either one of the wheel speeds Vw 1–Vw4, which is larger than the others, as a substantial wheel speed Vwm at step S102, a wheel speed change ΔVwm in the substantial wheel speed Vwm per a sampling period Δt is calculated at step S103. Subsequently, at step S104, a vehicle speed correction factor table, such as shown in FIG. 4, is searched to find a vehicle speed correction factor CVr according to the road surface friction level Mu. In this instance, the road surface friction level Mu is presumed as the smallest one of those for the wheels 1–3 of the first to third brake systems. Thereafter, a decision is made at step S105 as to whether the wheel speed change ΔVwm is less than the vehicle speed correction factor CVr.

If the answer to the decision is "YES," a speed resulting from subtracting the vehicle speed correction factor CVr from the preceding vehicle speed Vr is presumed as and substituted for a current vehicle speed Vr at step S106. This presumption causes the vehicle speed Vr to decline at an invariable rate equal to the vehicle speed correction factor CVr. On the other hand, if the answer to the decision is "NO," this indicates that the substantial wheel speed Vwm changes in excess, then, another decision is made at step S107 as to whether a difference of the vehicle speed Vr from the substantial wheel speed Vwm is greater than a predetermined value Vo, i.e. whether there is a great difference between these vehicle speed Vr and substantial wheel speed Vwm. If the answer to the decision is "YES," this indicates that there is in fact a great difference between the vehicle speed Vr and wheel speed Vwm, then, a speed resulting from subtracting the vehicle speed correction factor CVr from the preceding vehicle speed Vr is presumed as and substituted for a current vehicle speed Vr at step S106. However, if the answer to the decision is "NO," this indicates that the vehicle speed Vr is relatively close to the wheel speed Vwm, then, the wheel speed Vwm is presumed as and substituted for a current vehicle speed Vr at step S108. In this manner, the vehicle speed Vr is presumed and changes according to the greatest one of wheel speeds Vw1–Vw4, at every sampling period Δt.

Figure 5:
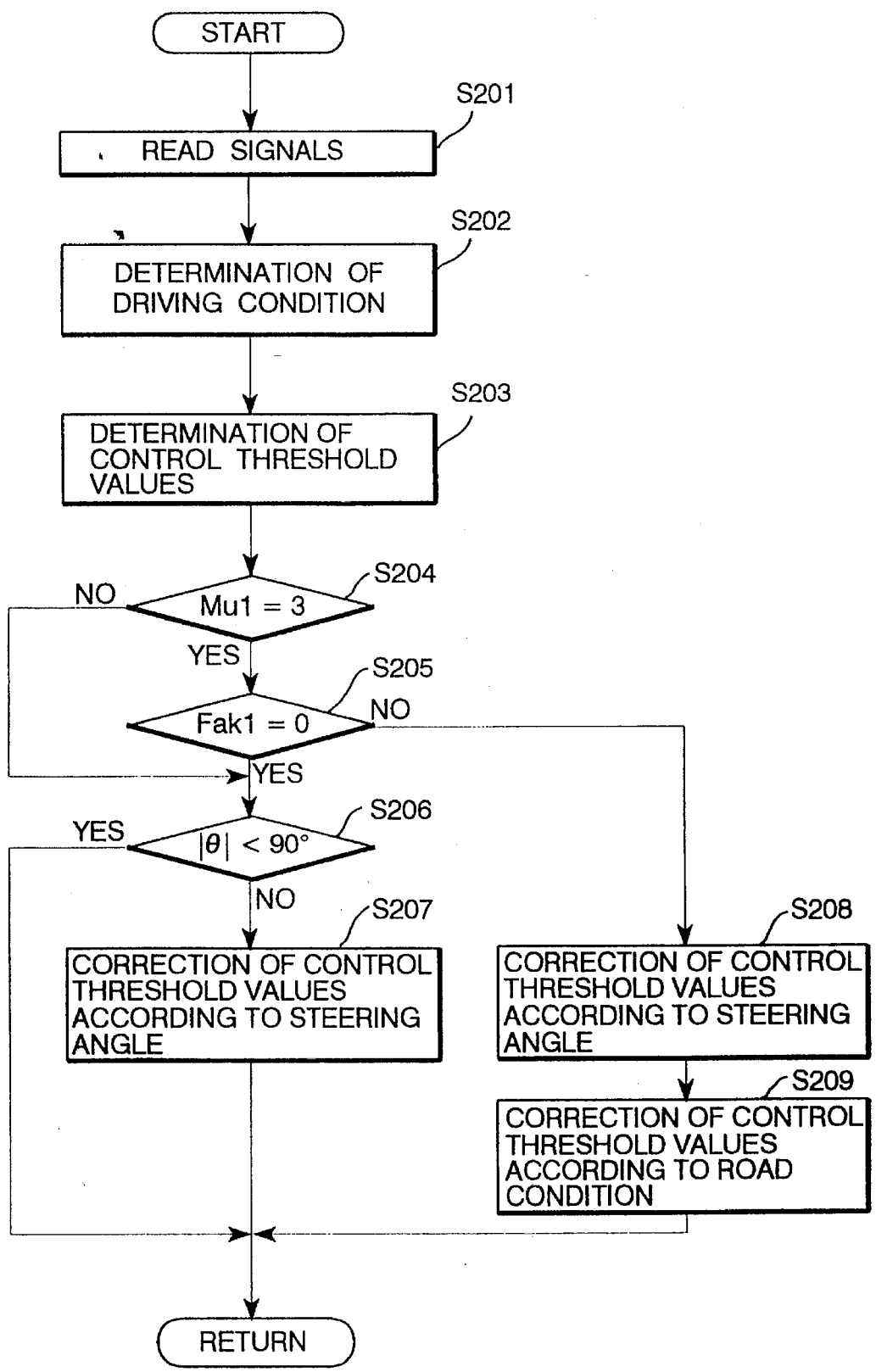
FIG. 5 is a flow chart illustrating a sequence routine of control threshold value correction.

Referring to FIG. 5, which is a flow chart illustrating the sequence routine of control threshold value determination, the first step at step S201 is to read signals indicative of various data, including a vehicle speed Vr, a road surface friction levels Mu1–Mu3 for the wheels 1–3, a steering angle θ, and the road condition flag Fak. According to the vehicle speed Vr, road surface friction level Mu and road condition, a driving condition parameter M is assigned by searching a table of driving condition parameters as shown in FIG. 6 at step S202. Subsequently, a control threshold value table, shown in FIG. 7, is searched to assign various control threshold values according to the driving condition parameter M at step S203. For instance, for the low road surface friction level (Mu=1), the driving condition parameter M is LM 1, LM 2 and LM 3 for the high speed range, the moderate speed range and the low speed range, respectively, if the road surface is in good condition (Fak=0). On the other hand, if the road surface is in bad condition (Fak=1), the driving condition parameter M depends upon vehicle speeds Vr only regardless of road surface friction levels Mu. This is because changes in wheel speed are significant and, consequently, the road surface friction coefficient $\mu$ a of road surface is apt to be presumed to be small during driving on bad roads. These road condition parameters Mu assign different values to a I–II deceleration threshold value B12, a II–III anti-slippage rate threshold value Bsg, a III–V deceleration threshold value B35 and a V–I anti-slippage rate threshold value Bsz for making judgements of a changeover of the antiskid braking control from the phase I to the phase II, from the phase II to the phase III, from the phase III to the phase V, and from the phase V to the phase I, respectively. These deceleration threshold values B12 and B35, which in turn have great effects to braking force, are established to be as close to 0 G as possible with a decline in the road surface friction level Mu, i.e. the road surface friction coefficient $\mu$, in order to make braking performance under high road surface friction coefficients $\mu$ and the responsiveness of brake control under low road surface friction coefficients $\mu$ compatible. In this instance, for the driving condition parameter of LM-2, values assigned to the threshold values B12, Bsg, B35 and Bsz are –0.5 G, 90%, 0 G and 90%, respectively.

Subsequently, a decision is made at step S204 as to whether the road surface is at the high friction level Mu of 3. If the answer to the decision is "YES," then, a decision is further made at step S205 as to whether the road condition flag Fak has been down or reset to the state of "0" indicating good road condition. If the answer to the decision regarding the high road surface friction level Mu at step S204 is "NO" or if the answer to the decision regarding road condition made at step S205 is "YES," another decision is made at step S206 as to whether the steering wheel 90 is turned through an angle $\theta$ less than 90° in any direction. If the steering angle $\theta$ is greater than 90°, a control threshold value correction is made according to the steering angle $\theta$ by looking up or searching a threshold value correction table shown in FIG. 8 at step S207. Specifically, if the road surface is at the low friction level Mu of 1 or the moderate friction level Mu of 2 regardless of road surface condition and if the road surface is at the high friction level Mu of 3 and in good condition, the anti-slippage rate threshold values Bsg and Bsz are changed by an increment of, for instance, 5% for the purpose of providing reliable steering.

If the answer to the decision regarding road condition made at step S205 is "NO," i.e. if the road surface is in bad condition, a control threshold value correction is made by looking up or searching the threshold value correction table shown in FIG. 8 at step S208. That is, the anti-slippage rate threshold values Bsg and Bsz are changed by a decrement of by 5% for steering angles $\theta$ less than 90°. However, the anti-slippage rate threshold values Bsg and Bsz are not changed for steering angles $\theta$ greater than 90°. Together, at step S209, the deceleration threshold value B 12 is changed by a decrement of, for instance, 1.0 G regardless of steering angles $\theta$. This correction is made to yield an intentional delay of control response so as to assure the application of braking force and is in particular effective when the wheel speed sensors 27–30 possibly cause errors of speed detection due to bad roads. Other threshold valves are left intact as they are. After the correction of threshold values either at step S207 or at step S209 or if the answer to the decision regarding the steering angle $\theta$ at step S206 is "YES," i.e. the steering wheel 90 is turned through an angle less than 90°, the sequence routine returns to restart. The sequence routine takes place to determine these control threshold values for the wheel of each of the first to third brake systems.

FIG. 9 is a flow chart illustrating the sequence routine of determining control phases and providing a pressure control signal in conformity with determined control phases to the valve units 20, 21 and 23. Although the following description is given with regard to the first brake system, brake pressure control signals are provided for the second and third brake systems in the same manner as for the first brake system. This sequence routine is repeated every short period, for instance 4 ms. After having read various data at step S301, a decision is made at step S302 as to whether there is a brake signal indicative of brake application. If there is no brake signal, after resetting the phase flag Fph1, the wheel lock flag Flok1 and the lock continuance flag Fcn1 to their states of "0" at step S303, the sequence subroutine returns and resumes.

On the other hand, if the answer to the decision is "YES," i.e. there is a brake application signal, a decision is made at step S304 as to the vehicle speed Vr and the wheel speed Vw1 of the driven wheel 1 are less than predetermined speeds C1 and C2, respectively. In this instance, the speeds C1 and C2 are predetermined to be, for instance, 5.0 km/h and 7.5 km/h, respectively. If the answer to the decision is "YES," this indicates that the vehicle has been sufficiently decelerated and it is not necessary to perform the antiskid braking control for the front driven wheel 1, then, after resetting the flags Fph1, Flok1 and Fcn1 to the states of "0" at step S303, the sequence routine returns. However, if the answer to the decision is "NO," a decision is made at step S305 as to whether the wheel lock flag Flok1 has been down or reset to the state of "0." If the answer to the decision is "YES," this indicate that the antiskid braking control has not yet commenced, then, a decision is made at step S306 as to whether there has occurred a speed reduction or deceleration of gravity DVw1 of the wheel 1 less than a predetermined deceleration of gravity Do, for instance 3 G. In the case where there has occurred a deceleration of gravity DVw1 less than the predetermined deceleration of gravity Do, after setting the wheel lock flag Flok1 and phase flag Fph1 to the state of "1" and the state of "2," which indicates the phase II, at steps S307 and S308, respectively, a pressure control signal predetermined for the increased pressure holding phase II is provided for the first valve unit 20 at step S309 and, thereafter, the sequence routine returns.

Ordinarily, after the commencement of the antiskid braking control, since the wheel lock flag Flok1 is up and the answer to the decision made at step S305 is "NO," a decision is made at step S310 as to whether the phase flag Fph1 has been set to the state of "2" indicating the phase II. If "YES," another decision is subsequently made at step S311 as to whether the anti-slippage rate Sw1 of the front driven wheel 1 is less than the II–III anti-slippage rate threshold value Bsg for the judgement of a changeover from the increased pressure holding phase II to the pressure reducing phase III. Because the anti-slippage rate Sw1 is always larger than the II–III anti-slippage rate threshold value Bsg at the beginning of the antiskid braking control, a pressure control signal predetermined for the increased pressure holding phase II is provided for the control unit 20 at step S309. Because the anti-slippage rate Sw1 is always larger than the II–III anti-slippage rate threshold value Bsg at an early period of the antiskid braking control, a pressure control signal for the increased pressure holding phase II is repeatedly provided. When the anti-slippage rate Sw1 becomes less than the II–III anti-slippage rate threshold value Bsg, after causing a changeover of the antiskid braking control into the pressure reducing phase III where the hydraulic braking pressure is reduced, and setting the phase flag Fph1 to the state of "3" indicating the phase III at step S312, a timer T1 is reset and restarted to count a time developing from the commencement of pressure increasing phase III at step S313. Subsequently, a pressure control signal predetermined for the pressure reducing phase III is provided for the control unit 20 at step S314.

If the answer to the decision made at step S310 is "NO," a decision is made at step S315 as to whether the phase flag Fph1 has been set to the state of "3" indicative of the pressure reducing phase III. If "YES," another decision is subsequently made at step S316 as to whether the deceleration of gravity DVw1 of the front wheel 1 is less than the III–V deceleration threshold value B35 for the judgement of a changeover from the pressure reducing phase III to the reduced pressure holding phase VI. Because the deceleration of gravity DVw1 is larger than the III–V deceleration threshold value B35 at the beginning of antiskid braking control, the answer to the decision is "NO," then, a pressure control signal predetermined for the pressure reducing phase III is provided for the calve unit 20 at step S314. For an early period of the antiskid braking control, a pressure control signal for the pressure reducing phase III is repeatedly provided and, when the deceleration of gravity DVw1 becomes less than the III–V deceleration threshold value B35, after a changeover to the reduced pressure holding phase V where the hydraulic braking pressure is held at the reduced level and setting the phase flag Fph1 to the state of "5" indicative of the phase V at step S317 and subsequently resetting a pressure reduction stage flag Fpr to a state of "0" at step S318, a pressure control signal predetermined for the reduced pressure holding phase V is provided for the valve unit 20 at step S319. The pressure reduction stage flag Fpr is used in the pressure reduction control subroutine called for at step S314 where a pressure control signal for the pressure reducing phase III of the antiskid braking control is provided.

Figure 9B:
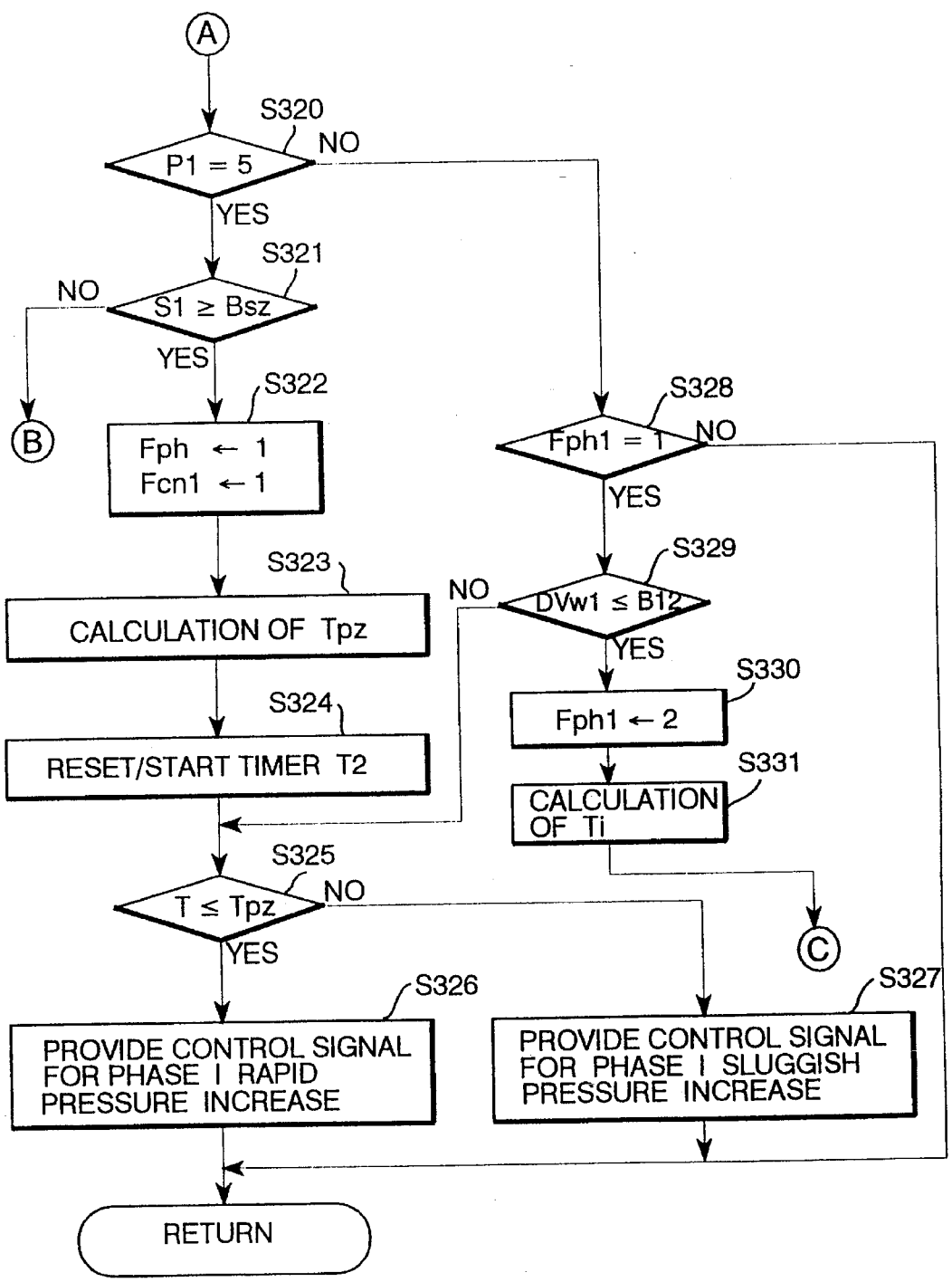

Further, if the answer to the decision made at step S315 regarding the state of "3" of the phase flag Fph1 is "NO," then, a decision is made at step S320 in FIG. 9B as to whether the phase flag Fph1 has been set to the state of "5" indicative of the reduced pressure holding phase V. If "YES," another decision is made at step S321 as to whether the anti-slippage rate Sw1 regarding the front wheel 1 is greater than the V-I anti-slippage rate threshold value Bsz for the judgement of a changeover from the reduced pressure holding phase V to the pressure increasing phase I. Because the anti-slippage rate Sw1 is less than the V-I anti-slippage rate threshold value Bsz at the beginning, the answer to the decision is "NO," then, a pressure control signal for the reduced pressure holding phase V is repeatedly provided at step S319. During the reduced pressure holding phase V, when the anti-slippage rate Sw1 gradually increases and reaches the V-I anti-slippage rate threshold value Bsz, i.e. when the answer to the decision is "YES," after a changeover of the antiskid braking control to the pressure increasing phase I and setting the phase flag Fph1 and the continuation flag Fcn1 to their states of "1" at step S322, a calculation is made at step S323 to determine an abrupt pressure increase time Tpz for which an abrupt increase in hydraulic braking pressure is caused at the beginning of pressure increasing phase I. This abrupt pressure increase time Tpz is proportional to a pressure increase continuance time Ti for which the pressure increasing phase I continues and which has been determined and stored at step S331 in the preceding sequence routine. Subsequently after resetting and restarting a timer T2 to count a time developing from the beginning of pressure increasing phase I at step S324, a decision is made at step S325 as to whether the timer T2 has counted up the abrupt pressure increase time Tpz. If the timer T2 has not yet count up the time Tpz, i.e. the answer to the decision is "YES," then, at step S326, a pressure control signal predetermined for the pressure increasing phase I is provided for the valve unit 20 so as to increase hydraulic braking pressure abruptly. On the other hand, if the answer to the decision is "NO," then, a pressure control signal predetermined for the pressure increasing phase I is provided for the valve unit 20 so as to increase hydraulic braking pressure gradually at step S327.

After a changeover to the pressure increasing phase I, the answer to the decision regarding the state of "5" of the phase flag Fph1 made at step S320 becomes "NO," then, a decision is made at step S328 as to whether the phase flag Fph1 has been set to the state of "1" indicative of the abrupt pressure increasing phase I. If "YES," another decision is subsequently made at step S329 as to whether the deceleration of gravity DVw1 of the front wheel 1 is less than the I–II deceleration threshold value B12. Because the deceleration of gravity DVw1 is larger than the I–II deceleration threshold value B12 at the beginning, the answer to the decision is "NO," then, after making the decision regarding the abrupt pressure increase time Tpz for an abrupt pressure increase made at step S325, a pressure control signal is provided at step S326 or S327. When the answer to the decision regarding the deceleration of gravity DVw1 made at step S329 becomes "YES," after setting the phase flag Fph to the state of "2" indicative of the increased pressure holding phase II at step S330, a pressure increase continuance time Ti is determined based on a count of the timer T2 at step S331. Subsequently, a pressure control signal for the increased pressure holding phase II is provided at step S309. As clearly shown in FIG. 13, the antiskid braking control progresses taking these phases II, III, V and I in order repeatedly once the control commences and is suspended when the brake signal disappears, i.e. the "NO" answer is given at step S302 or when the vehicle speed Vr and wheel speed Vw1 of the driven wheel 1 have become less than predetermined speeds C1 and C2, respectively, i.e. the "YES" answer is given at step S303.

Figure 10A:
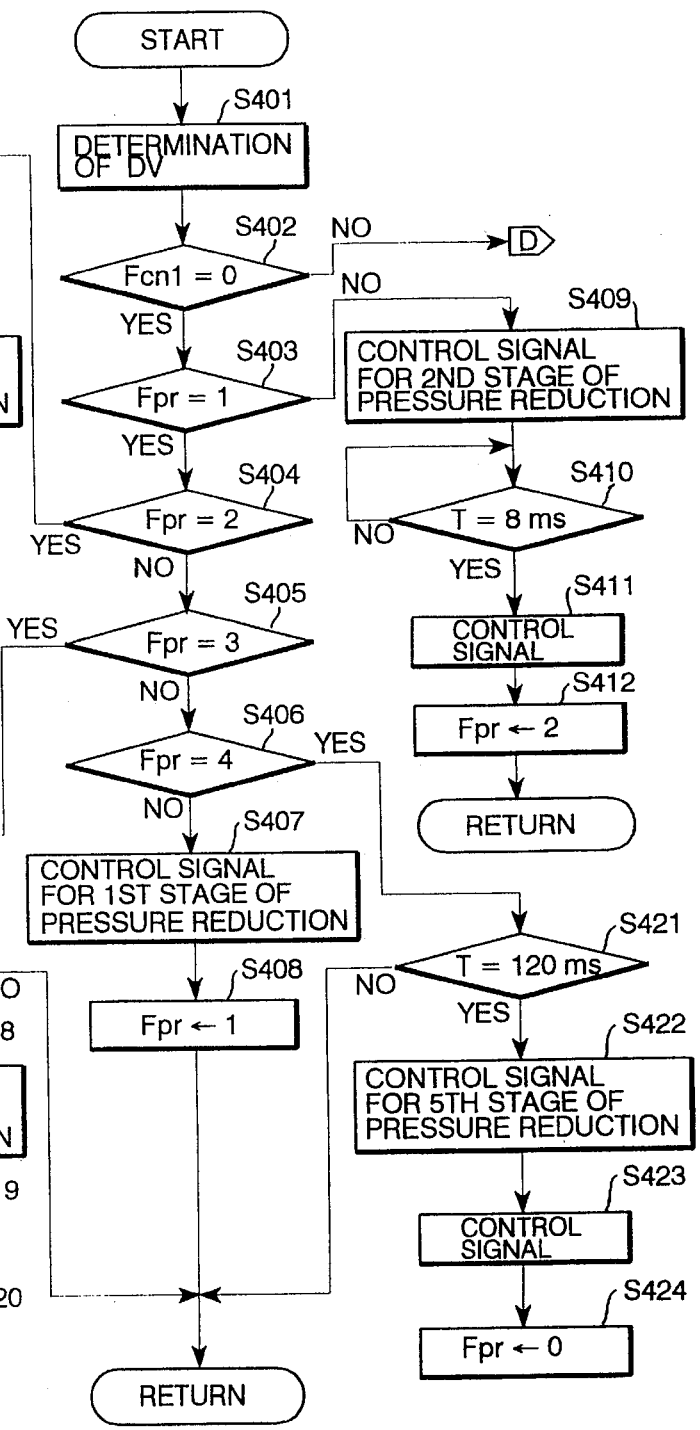
Figure 10B:
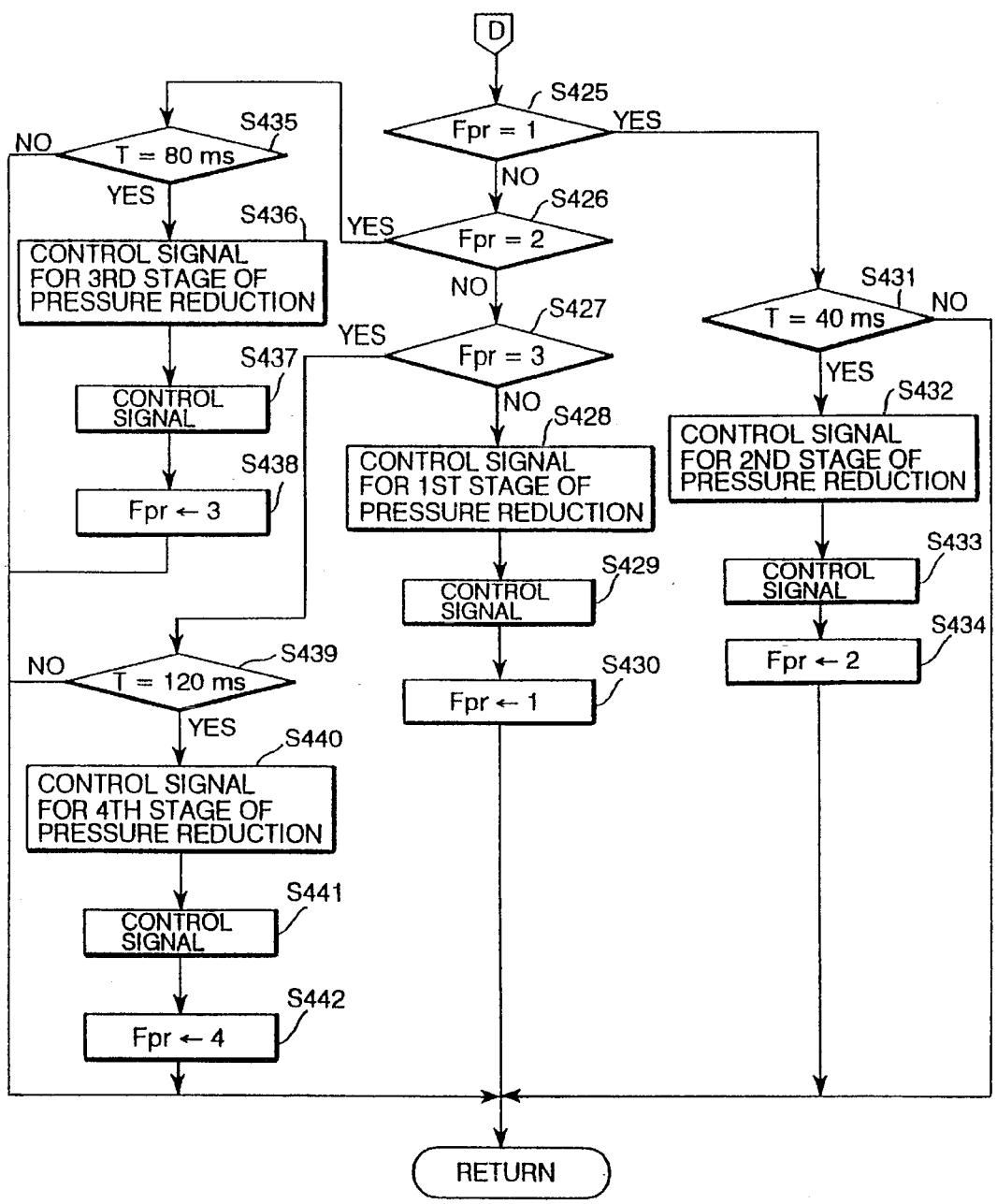
Figures 12, 14:
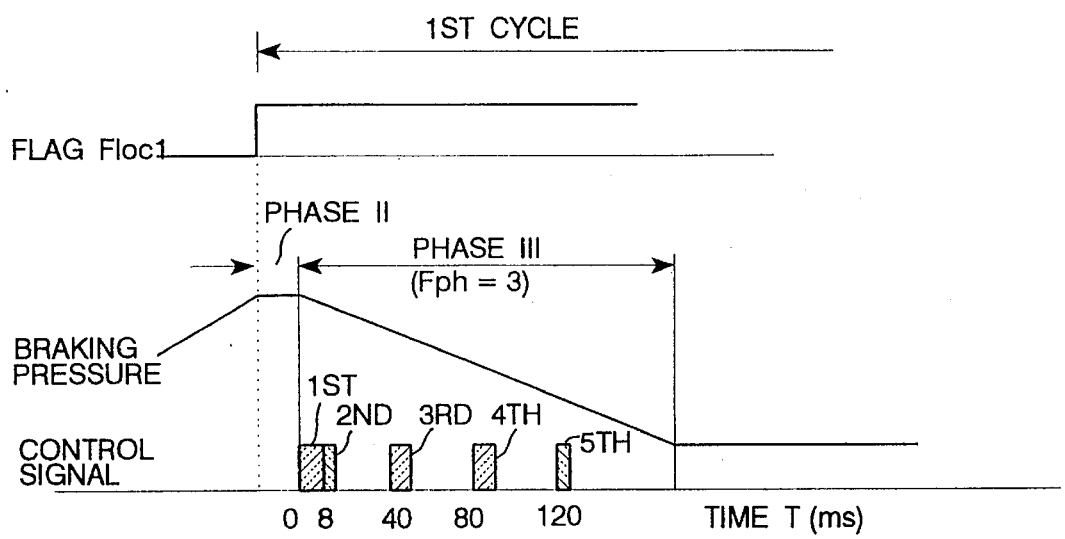
FIG. 12 is a table showing quantitative pressure reduction at various pressure reduction levels for first to fifth stages of pressure reduction.
FIG. 14 is a diagram showing a pressure reduction pattern in the pressure reducing phase III during a first cycle of the antiskid braking control.

FIG. 10 shows a flow chart of the pressure reduction control subroutine called for at step S314 in the sequence routine of determining control phases and providing brake control signal shown in FIG. 9. As shown in FIG. 14, in the pressure reducing phase III, pressure reduction is performed in five stages by opening the relief valve 20b intermittently five times during a first cycle of the antiskid braking control. However, after the first cycle of the antiskid braking control, pressure reduction is performed in four stages by opening the relief valve 20b intermittently four times. The amount of pressure reduction is controlled by regulating a time for which the relief valve 20b is kept opened. As shown in a table in FIG. 12, the first to fifth stages of pressure reduction commence at times of 0, 8, 40, 80 and 120 ms after the commencement of the pressure reducing phase III, respectively, and the amount of pressure reduction is determined by keeping the relief valve 20b opened for different times from 0 to 20 ms for road surfaces of low friction coefficients, or from 2 to 22 ms for road surfaces of high friction coefficients, according to levels of pressure reduction. The pressure reduction levels DL, DM, DS and DVS are determined on the basis of a pressure reduction transformation DV given by the following equation:

$$DV = Sm + kc \cdot |DVw1|$$

where Sm is the present slippage and equivalent to the difference of the vehicle speed Vr from the wheel speed Vw; and kc is an unvariable.

The pressure reduction transformation DV defines an index of how large the present slippage Sm increases and is used to perform pressure reduction for antiskid braking control in anticipation of an increase in slippage in the near future. The pressure reduction level is determined to be at a high level DL for values of the pressure reduction transformation DV equal to or larger than a threshold value of K3, at a moderate level DM for values of the pressure reduction transformation DV equal to or larger than a threshold value of K2 and smaller than the threshold value of K3, at a low level DS for values of the pressure reduction transformation DV equal to or larger than a threshold value of K1 and smaller than the threshold value of K2, or at an extremely low level DVS for values of the pressure reduction transformation DV smaller than the threshold value of K1. In this instance, these threshold values K1–K3 are 0.05 Vr, 0.10 Vr and 0.25 Vr, respectively. According to the pressure reduction levels, the amount of pressure reduction of the first to fifth stages are determined in the form of a time for which the relief valve 20b is kept opened.

When the pressure reduction control subroutine commences, after determining a pressure reduction level according to a pressure reduction transformation DV at S401, a decision is made at step S402 as to whether the lock continuance flag Fcn1 is down or reset to the state of "0". If the lock continuance flag Fcn1 has been down, decisions are subsequently made at steps S403–S406 as to whether the pressure reduction stage flag Fpr is set to states of 1," "2," "3" and "4" representative of the second to fifth pressure reduction stages, respectively. If the pressure reduction stage flag Fpr is set to the state of "0" indicative of the first stage of pressure reduction, i.e. the answers to the decisions made at steps S403–406 are "NO," a first stage pressure reduction control signal is provided for the first stage pressure reduction at step S407. During the first stage of pressure reduction, a reduction of hydraulic braking pressure is effected not according to pressure reduction levels but unconditionally. That is, the first stage pressure reduction control signal keeps the relief valve 20b opened for a predetermined period of time, for instance 8 ms. for ordinary road surfaces or 16 ms. for road surfaces of high friction coefficients μ. After setting the pressure reduction stage flag Fpr to the state of "1" indicative of the second stage of pressure reduction at step S408, the sequence routine returns.

If the pressure reduction stage flag Fpr has been set to the state of "1" at step S403, a second stage reduction of hydraulic braking pressure, which is given in the form of a time for which the relief valve is kept opened or a pulse width of a control signal which keeps the relief valve opened, is determined according to a pressure reduction level shown in table in FIG. 12 at step S409. Subsequently, a decision is made at step S410 as to whether the timer T1, which has started at step S313 in the control phase and pressure control signal determination routine of FIG. 9, has counted a time developing from the commencement of pressure increasing phase III longer than 8 ms. This decision is repeated until the timer T1 has counted 8 ms. At a lapse of 8 ms., a control signal is provided so as to open the relief valve 20b of the valve unit 20 for a period of, for instance, 20 ms. for ordinary roads or 23 ms. for high resistance roads, when the pressure reduction level is high (DL) at step S411. After setting the pressure reduction stage flag Fpr to the state of "2" at step S412, the sequence routine returns.

If the pressure reduction stage flag Fpr has been set to the state of "2" at step S404, a decision is made at step S413 as to whether the timer T1 has counted a time developing from the commencement of pressure increasing phase III longer than 40 ms. If the answer is "YES," a third stage reduction of hydraulic braking pressure is determined according to a pressure reduction level at step S414 and, at a lapse of 40 ms. from the commencement of pressure increasing phase III, a control signal is provided so as to open the relief valve 20b of the valve unit 20 for a period of, for instance, 8 ms. for ordinary roads or 10 ms. for high resistance roads, when the pressure reduction level is high (DL) at step S415. If the answer to the decision made at step S413 is "NO" or after setting the pressure reduction stage flag Fpr to the state of "3" at step S416, the sequence routine returns.

Similarly, if the pressure reduction stage flag Fpr has been set to the state of "3" at step S405, a decision is made at step S417 as to whether the timer T1 has counted a time developing from the commencement of pressure increasing phase III longer than 80 ms. If the answer is "YES," a fourth stage reduction of hydraulic braking pressure is determined according to a pressure reduction level at step S418 and, at a lapse of 80 ms. from the commencement of pressure increasing phase III, a control signal is provided so as to open the relief valve 20b of the valve unit 20 for a period of, for instance, 10 ms. for ordinary roads or 12 ms. for high resistance roads, when the pressure reduction level is high (DL) at step S419. If the answer to the decision made at step S417 is "NO" or after setting the pressure reduction stage flag Fpr to the state of "4" at step S420, the sequence routine returns.

Further, if the pressure reduction stage flag Fpr has been set to the state of "4" at step S406, a decision is made at step S421 as to whether the timer T1 has counted a time developing from the commencement of pressure increasing phase III longer than 120 ms. If the answer is "YES," a fifth stage reduction of hydraulic braking pressure is determined according to a pressure reduction level at step S423 and, at a lapse of 120 ms. from the commencement of pressure increasing phase III, a control signal is provided so as to open the relief valve 20b of the valve unit 20 for a period of, for instance, 20 ms. for ordinary roads or 22 ms. for high resistance roads, when the pressure reduction level is high (DL) at step S423. If the answer to the decision made at step S417 is "NO" or after setting the pressure reduction stage flag Fpr to the state of "0" at step S424, the sequence routine returns.

On the other hand, if the answer to the decision concerning the lock continuance flag Fcn1 is "NO," i.e. it has been up, this indicates that the pressure increasing phase III is taking place after the first cycle, then, decisions are subsequently made at steps S425–S427 as to whether the pressure reduction stage flag Fpr is set to states of "1," "2" and "3" representative of second to fourth pressure reduction stages in any cycle after the first cycle, respectively. If the pressure reduction stage flag Fpr is set to the state of "0" indicative of the first stage of pressure reduction, i.e. the answers to the decisions made at steps S425–427 are "NO," a first stage reduction of hydraulic braking pressure is determined according to a pressure reduction level at step S428 and a first stage pressure reduction control signal is provided for the first stage pressure reduction in the cycle after the first cycle so as to open the relief valve 20b of the valve unit 20 for a period of, for instance, 20 ms. for ordinary roads or 23 ms. for high resistance roads, when the pressure reduction level is high (DL) at step S429. After setting the pressure reduction stage flag Fpr to the state of "1" indicative of the second stage of pressure reduction at step S430, the sequence routine returns.

If the pressure reduction stage flag Fpr has been set to the state of "1" at step S425, another decision is made at step S431 as to whether the timer T1 has counted a time developing from the commencement of pressure increasing phase III longer than 40 ms. If the answer is "YES," a second stage reduction of hydraulic braking pressure is determined at step S432 and, at a lapse of 40 ms. from the commencement of pressure increasing phase III, a control signal is provided so as to open the relief valve 20b of the valve unit 20 for a period of, for instance, 8 ms. for ordinary roads or 10 ms. for high resistance roads, when the pressure reduction level is high (DL) at step S433. If the answer to the decision made at step S431 is "NO" or after setting the pressure reduction stage flag Fpr to the state of "2" at step S434, the sequence routine returns.

If the pressure reduction stage flag Fpr has been set to the state of "2" at step S426, another decision is made at step S435 as to whether the timer T1 has counted a time of 80 ms. If the answer is "YES," a third stage reduction of hydraulic braking pressure is determined at step S436 and, at a lapse of 80 ms., a control signal is provided so as to open the relief valve 20b of the valve unit 20 for a period of, for instance, 10 ms. for ordinary roads or 12 ms. for high resistance roads, when the pressure reduction level is high (DL) at step S437. If the answer to the decision made at step S435 is "NO" or after setting the pressure reduction stage flag Fpr to the state of "3" at step S438, the sequence routine returns.

Similarly, if the pressure reduction stage flag Fpr has been set to the state of "3" at step S427, another decision is made at step S439 as to a time lapse of 120 ms. If the answer is "YES," a fourth stage reduction of hydraulic braking pressure is determined at step S440 and, at a lapse of 120 ms. from the commencement of pressure increasing phase III, a control signal is provided so as to open the relief valve 20b of the valve unit 20 for a period of, for instance, 20 ms. for ordinary roads or 22 ms. for high resistance roads, when the pressure reduction level is high (DL) at step S441. If the answer to the decision made at step S439 is "NO" or after setting the pressure reduction stage flag Fpr to the state of "0" at step S442, the sequence routine returns.

In order to cope with sudden changes in road surface condition from high friction coefficients μ to high friction coefficients μ, the sequence subroutine of continuous pressure reduction control, which is shown by a flow chart in FIG. 11, is coincidentally carried out.

When the continuous pressure reduction control subroutine commences and control proceeds directly to a decision at step S501 as to whether the timer T1 has counted a time of 40 ms. The continuous pressure reduction control subroutine resumes until a lapse of the time. Once the timer T1 counts the time, a decision is made at step S502 as to whether a time that the time T1 has counted is between 40 and 80 ms. If the counted time is less than 80 ms., another decision is made as to the high pressure reduction level DL at step S503. If the answer to the decision is "YES," this indicates that there is a strong demand for pressure reduction, then, a start signal is provided at step S504 so as to keep the relief valve 20b opened, thereby causing a continuous pressure reduction. When the answer to the decision made at step S503 becomes "NO" resulting from the continuous pressure reduction, a stop signal is provided at step S505 so as to close the relief valve 20b, thereby terminating the continuous pressure reduction.

On the other hand, if the counted time is greater than 80 ms., another decision is made at step S506 as to the high pressure reduction level DL at step S506. If the answer to the decision is "YES," this indicates that there is still a strong demand for pressure reduction, then, a start signal is provided at step S507 so as to keep the relief valve 20b opened, thereby causing a continuous pressure reduction. When the answer to the decision made at step S503 becomes "NO" resulting from the continuous pressure reduction, a decision is made at step S508 as to the moderate pressure reduction level DM. If the answer to the decision is "YES," this indicates that there is still a demand for pressure reduction, then, a start signal is provided at step S509 so as to keep the relief valve 20b opened, thereby causing a continuous pressure reduction. When the answer to the decision made at step S508 becomes "NO" resulting from the continuous pressure reduction, a stop signal is provided at step S510 so as to close the relief valve 20b, thereby terminating the continuous pressure reduction.

Figure 13:
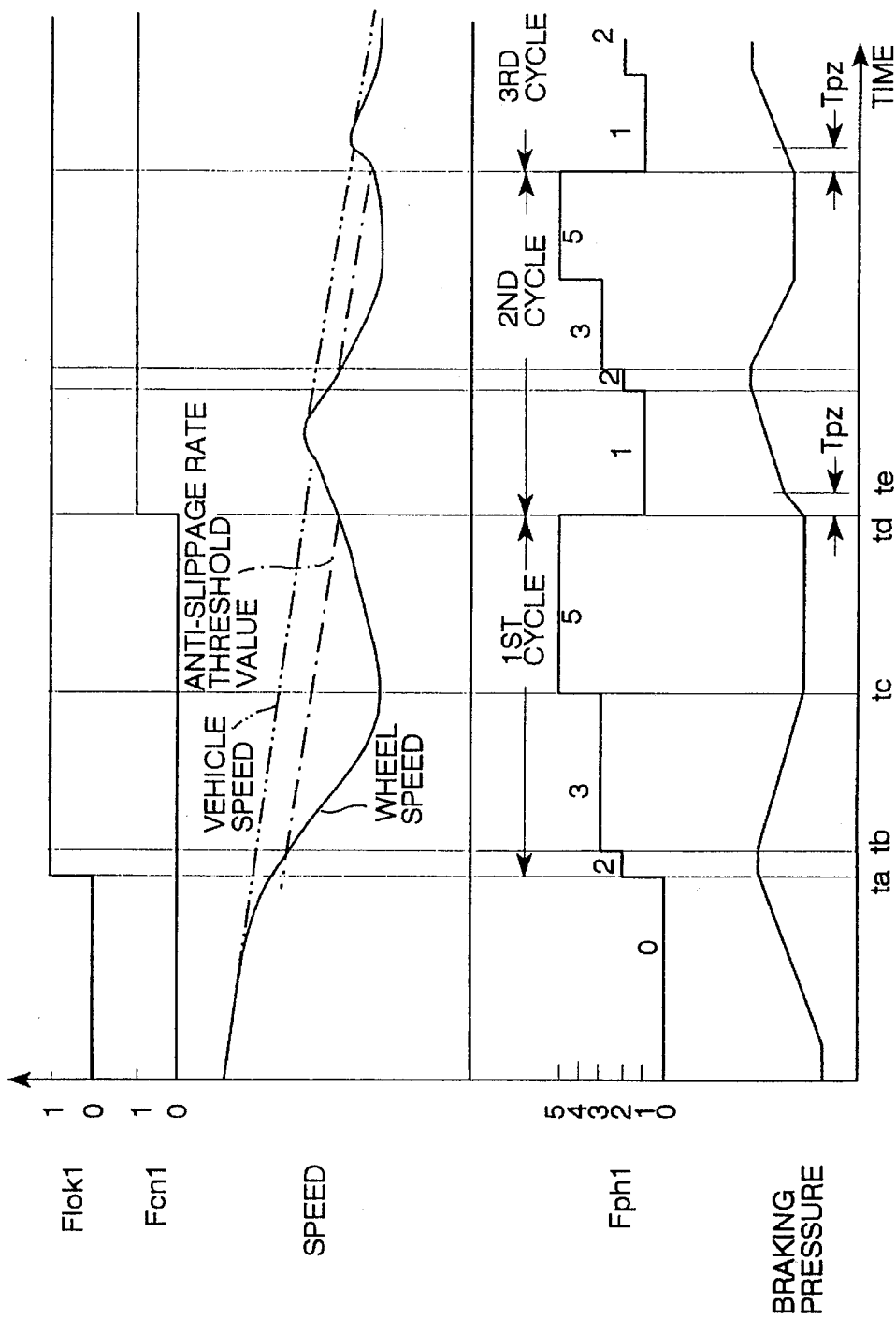
FIG. 13 is a time chart showing the operation of antiskid braking control.

The operation of the antiskid braking control will be more clearly understood by reviewing a time chart shown in FIG. 13, which is related to the front driven wheel 1.

In the case that the antiskid braking control is not carried out during deceleration, when the deceleration of gravity DVw1 of the front driven wheel 1 reaches 3 G as a result of a gradual intensification of hydraulic braking pressure due to the operation of the brake pedal 16, the wheel lock flag Flok1 is up at a time ta and the antiskid braking control commences incidentally. The antiskid braking control commences substantially at a time ta the brake lock flag Flok1 is up. In the first cycle of the antiskid braking control immediately after the commencement of the antiskid braking control, the parameter of road surface friction level Mu1 is determined according to a road surface friction coefficient μ and a driving condition parameter M is designated according to the parameter of road surface friction level Mu1 and vehicle speed Vr so as to determine unconditionally the control threshold values B12, Bsg, B35 and Bsz. An anti-slippage rate Sw1 and deceleration of gravity DVw1 or acceleration of gravity AVw1 of the front driven wheel 1 are compared with their corresponding threshold values. The antiskid braking control shifts to the increased pressure holding phase II where the hydraulic braking pressure is held at an increased level directly after the commencement of control. When the anti-slippage rate Sw1 declines and reaches less than the II–III anti-slippage rate threshold value Bsg, it shifts to the pressure reducing phase III from the increased pressure holding phase II at a time tb. During the pressure reducing phase III, the hydraulic braking pressure is continually reduced in five stages. With progress of a gradual pressure reduction, the front driven wheel 1 starts a recovery of rotational speed. When the deceleration of gravity DVw1 of the front driven wheel 1 reaches the III–V deceleration threshold value B35, which is for instance 0 G, the antiskid braking control shifts to the reduced pressure holding phase V from the pressure reducing phase III at a time tc.

During the reduced pressure holding phase V, the front driven wheel 1 increases its wheel speed Vw1 gradually and, as soon as the anti-slippage rate Sw 1 reaches above the V-I anti-slippage rate threshold value Bsz at a time td, a second cycle of the antiskid braking control takes place. This forces the antiskid braking control to shift to the pressure increasing phase I following setting the continuous flag Fcn 1 up. Immediately after the shift to the pressure increasing phase I, the switching valve 20a of the valve unit 20 maintains fully opened and the relief valve 20b is closed, causing the hydraulic braking pressure to increase sharply for the period of an abrupt pressure increase time Tpz determined using a pressure increase continuance time Ti in the previous cycle of control as a parameter. After the lapse of the abrupt pressure increase time Tpz at a time te, the switching valve 20a is operated to open and close at a specified duty rate, causing a gradually pressure increase at a rather gentle inclination. Accordingly, immediately after shifting to the second cycle of control, it is provided a reliable increase in the hydraulic braking pressure, ensuring braking force.

Because, after the second cycle of control, an appropriate road surface friction level Mu1 is determined and, on the basis of a driving condition parameter M according to the road surface friction level Mu1 and a vehicle speed Vr, appropriate control threshold values Bsg, Bsz, B12 and B35 are determined, so as to perform precise control of the hydraulic braking pressure according to vehicle driving conditions.

If, in the reduced pressure holding phase V during the second cycle of control, the ant-slippage rate Sw1 is still larger than the V-I anti-slippage rate threshold value Bsz, the antiskid braking control shifts to the pressure increasing phase I in another or third cycle of control.

The sequence subroutine of threshold value correction for hydraulic braking pressure control may be partly varied.

With the antiskid braking system, since, during the pressure reducing phase III of a first cycle of the antiskid braking control, which is indicated by the lock continuance flag Fcn reset to the state of "0," a first stage pressure reduction is effected unconditionally regardless of pressure reduction levels (at step S407 of the pressure reduction control subroutine shown in FIG. 10) and is kept to an indispensable minimum, it is free from effects of changes in anti-slippage rate Sw and deceleration DVw of the wheel.

The interrupt routine, depicted as a flow chart in FIG. 15, operates to control abrupt pressure increase during the pressure increasing phase I of the antiskid braking control and is called for at regular intervals during performing the antiskid braking control. The interrupt routine operates in the same manner for each of the wheels 1–3. In the interrupt routine, a decision is made at step S601 as to whether the control is in the phase of abrupt pressure increase. If it is not in the phase of abrupt pressure increase, the interrupt routine returns. Otherwise, another decision is made at step S602 as to whether the road condition flag Fak has been down or reset to the state of "0". If the answer to the decision is "YES," this indicates that the road surface on which the vehicle travels is in good condition, then, a calculation is made at step S603 to determine initial wheel acceleration or deceleration of gravity G1 at a time 8 ms. after the commencement of the phase of abrupt pressure increase. Subsequently, a detection is made at step S604 to determine and the lowest wheel acceleration or deceleration of gravity G2 in a period of time, for instance 104 ms., from the commencement of the phase of abrupt pressure increase and store it in the memory. For the determination of the lowest wheel acceleration or deceleration of gravity G2, either one of the preceding lowest wheel acceleration or deceleration of gravity G2 stored in the memory and currently detected wheel acceleration or deceleration of gravity G2 which is lower than another is substituted for the preceding one and stored. Such a renewal of the lowest wheel acceleration or deceleration of gravity G2 is repeated. At step S605, a calculation is made to determine the difference Gt between the initial and lowest wheel acceleration or deceleration of gravity G1 and G2. Thereafter, according to grades of the difference of wheel acceleration or deceleration of gravity Gt which are determined at steps S606 and 608, a control rate is determined. The control rate is set to one of 1–4 rates at which hydraulic braking pressure is abruptly increased, respectively.

As shown in FIG. 16, these control levels Lc define duty rates in the form of time for the switching valve 20a of the valve unit 20 differently according to the road surface friction levels Mu. For instance, if the switching valve 20b has a duty cycle of 40 ms., the control level Lc 1 allows the switching valve 20b to open for 6 ms. and close for 34 ms., when the road is at the road surface friction level Mu of 1. Similarly, when the road is at the road surface friction level Mu of 2, the control level Lc 3 allows the switching valve 20b to open for 18 ms. and close for 22 ms. Because the larger the opening time of the switching valve 20b, the larger the incline at which the master cylinder 18 increases the hydraulic braking pressure, the larger the control level Lc is, the more sharp the rise of hydraulic braking pressure during the phase of abrupt pressure increase. The duty rate is defined so as to increase with an increase in road surface friction coefficient $\mu$. This is because a limit of an increase in hydraulic braking pressure to an occurrence of wheel lock rises with an increase in road surface friction coefficient $\mu$ and a sharp increase in hydraulic braking pressure permits quick braking without an occurrence of a wheel lock. Together, controlling the hydraulic braking pressure acting on the wheel on a road having a high surface friction coefficient $\mu$ renders a pressure difference after an increase in hydraulic braking pressure relatively small for any braking circumstances due to a high base braking pressure produced by operating the brake pedal. Consequently, it is desirable for a stable braking action not to provide a bustling increasing change in braking pressure at the beginning. For this reason, the duty rate is not changed regardless of the control Levels Lc for roads of the friction level Mu of 3.

Specifically, if the difference of wheel acceleration or deceleration of gravity Gr is less than 0.3 G, the control rate is changed one step up. at step S607. Further, if the difference of wheel acceleration or deceleration of gravity Gr is greater than 0.8 G, the control rate is changed one step down at step S609. However, if the difference of wheel acceleration or deceleration of gravity Gr is between 0.3 G and 0.8 G, this indicates that the control of hydraulic braking pressure is be proper, then, the sequence routine returns without changing the control rate.

On the other hand, if the answer to the decision concerning road conditions made at step S602 is "NO," this indicates that the road surface on which the vehicle travels is in bad condition. In such a case, since the wheel acceleration G1 and G2 possibly change too frequently to be accurately determined and, consequently, it is hard to monitor the resultant hydraulic braking pressure after control, the sequence routine returns without changing the control level flag Fcr.

Figure 17:
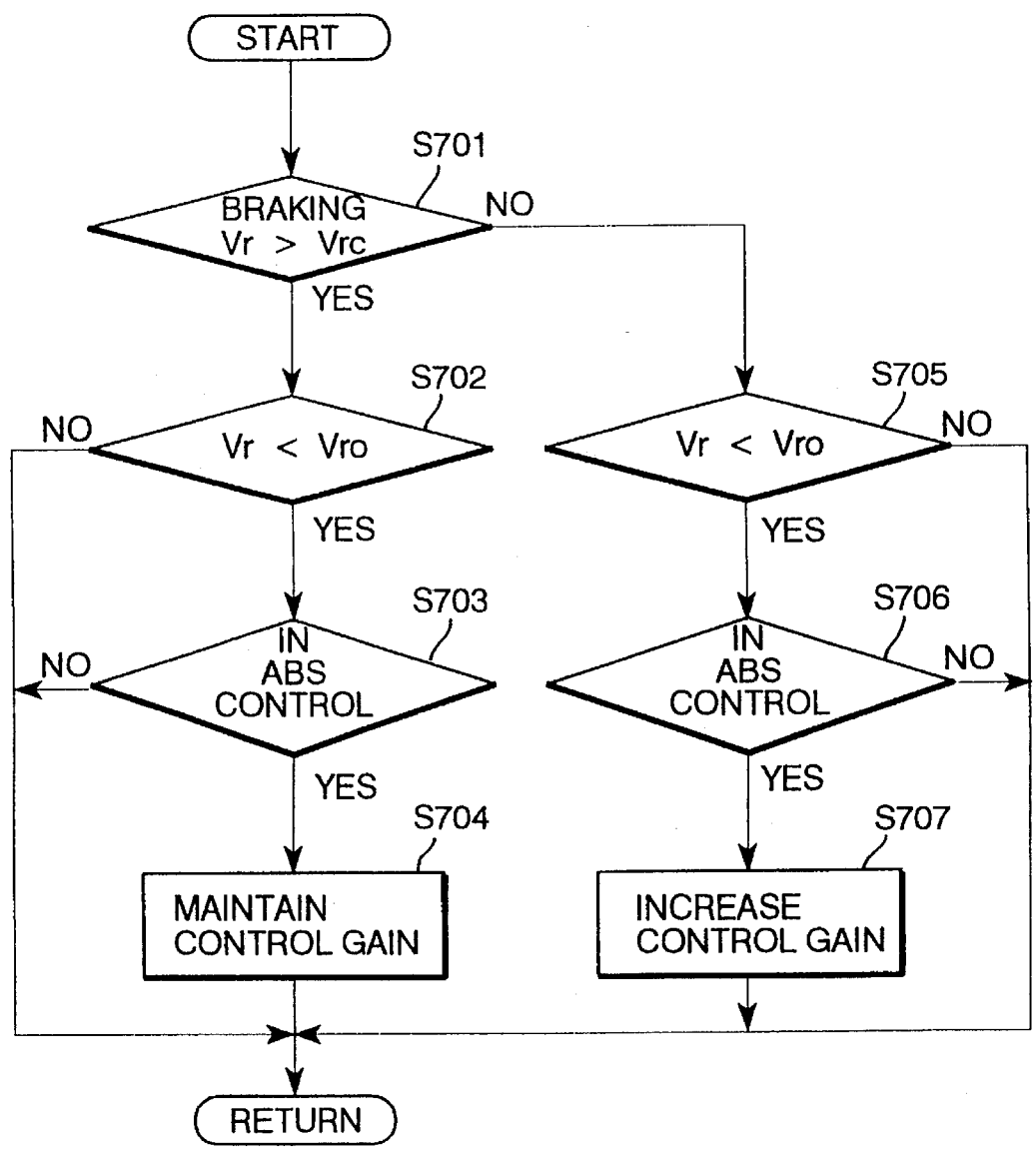
FIG. 17 is a flow chart illustrating a sequence routine of control gain alteration.

In the antiskid braking system, a control gain changing sequence routine, depicted as a flow chart in FIG. 17, is carded out so as to change the gain of control according to vehicle speeds Vr.

Referring to FIG. 17, the control gain changing sequence routine commences and control proceeds directly to a decision at step S701 as to whether the vehicle speed Vr at a time the brake pedal 16 is operated is higher than a specified braking speed Vrc, for instance 80 km/h. If the vehicle speed Vr is higher than the specified braking speed Vrc, a decision is made at step S702 as to whether the vehicle speed Vr has dropped below a specified low speed Vrlo, for instance 20 km/h. If the answer to the decision is "YES," another decision is subsequently made at step S703 as to whether the antiskid braking control (ABS) is in operation. If the answer is "YES," the antiskid braking control is continued without changing the control gain. However, if the answer to the decision made at step S702 or at step S703 is "NO," the sequence returns and restarts.

On the other hand, if the vehicle speed Vr at operation of the brake pedal 16 is lower than the specified braking speed Vrc, a decision is made at step S705 as to whether the vehicle speed Vr has dropped less than the specified low speed Vrlo. If the answer to the decision is "YES," another decision is subsequently made at step S706 as to whether the antiskid braking control (ABS) is in operation. If the answer is "YES," the control gain of the antiskid braking control is changed. For the change of control gain, another table of threshold values is prepared as shown in FIG. 18. In the table, the II–III anti-slippage rate threshold value Bsg is changed according to driving conditions, specifically increased by 2% from that for the ordinary antiskid braking control (ABS). For instance, the II–III anti-slippage rate threshold value Bsg is changed from 95% to 97% for the driving condition parameter HM-1, from 90% to 92% for the driving condition parameter HM-2, and from 85% to 87% for the driving condition parameter HM-1. If a target slippage rate is used as a pressure reduction threshold value, it may be reduced by 2% for changing or increasing the control gain. However, if the answer to the decision made at step S705 or at step S706 is "NO," the sequence returns and restarts.

As a result of the change in control gain, the amount of pressure reduction at the first to fourth stages after the first cycle are changed or increased by prolonging times for which the relief valve is kept opened by 2 ms. as shown in table in FIG. 19. Together, duty rates for the switching valve 20a of the valve unit 20 are prolonged 2 ms. as shown in table in FIG. 20.

With the antiskid braking system, since the control gain is changed to be greater during deceleration of the vehicle to speeds less than the specified low speed of 20 km/h from speeds, for instance 100 km/h, higher than the specified braking speed of 80 km/h than during deceleration of the vehicle to speeds less than the specified low speed of 20 km/h from speeds, for instance 50 km/h, lower than the specified braking speed of 80 km/h, hydraulic braking pressure is, on one hand, quickly reduced so as to provide a speedy recovery of rotational speed even tough the road surface causes less reaction against the wheel and, on the other hand, increased early after-reduction so as to prevent a lack of braking force. If the vehicle speed Vr at the commencement of braking is 100 km/h, which is very high, the vehicle is brought into a halt with a load concentrated on the front wheels, so that the road surface yields great reaction against the front wheels even in a range of speeds less than the specified low speed of 20 km/h. Consequently, the vehicle is brought into a steady halt by means of the antiskid braking control in which the control gain is not changed in the low speed range. Viewing this in a different light, there is yielded steady drivability and reliable braking force. Furthermore, keeping the control gain of the antiskid braking control unchanged in the low speed range secures the presumption of vehicle speed Vr, providing improvement of the antiskid braking control.

The control gain to the antiskid braking control may be changed in different manners as shown in FIGS. 21 and 22.

In a variant of the control gain changing sequence routine, depicted as a flow chart in FIG. 20, in place of the decision as to whether the vehicle speed Vr at a time the brake pedal 16 is operated is higher than the specified braking speed Vrc, a decision is made at step S701A as to whether the vehicle speed Vr at a time the antiskid braking control is commenced is higher than a specified antiskid braking speed Vrc. The control gain is changed or increased when the vehicle is braked at speeds less than the specified antiskid braking speed Vrc and has dropped the speed Vr below the specified low speed Vrlo during antiskid braking.

FIG. 21 is a flow chart illustrating another variant of the control gain changing sequence routine. In the sequence routine, in place of the decision as to whether the vehicle speed Vr at a time the brake pedal 16 is operated is higher than the specified braking speed Vrc, a decision is made at step S701B as to whether there is caused specified deceleration Go, for instance 0.7 G, during braking. When the vehicle has dropped the speed Vr below the specified low speed Vrlo during antiskid braking after an occurrence of deceleration Go of 0.7 G, the control gain is changed or increased.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. An antiskid braking system for performing antiskid braking control by periodically increasing and reducing hydraulic braking pressure according to a wheel speed during braking so as to control a vehicle going into a skid, said antiskid braking system comprising:

speed sensor means for detecting rotational speeds of wheels and presuming a vehicle speed based on said wheel speeds;

a brake sensor for detecting commencement of braking; and control means for performing said antiskid braking control at a control gain which is greater in a low speed range of vehicle speeds less than a specified speed when a vehicle speed at a time of commencement of braking detected by said brake sensor is low as compared to a vehicle speed at said time is high.

2. An antiskid braking system as defined in claim 1, wherein said control means changes said control gain to be greater when a vehicle speed at a time commencement of braking is detected by said brake sensor is lower than a specified speed as compared to when a vehicle speed at said time is higher than said specified speed.

3. An antiskid braking system as defined in claim 2, wherein said control means further calculates a slippage rate based on said wheel speed and said vehicle speed and causes a reduction of said hydraulic braking pressure in said antiskid braking control when said slippage rate is above a target slippage rate.

4. An antiskid braking system as defined in claim 3, wherein said control means changes said control gain to be greater by changing said target slippage rate to be lower.

5. An antiskid braking system as defined in claim 2, wherein said control means further includes an electronic valve which is operated with a pulse signal so as to regulate said hydraulic braking pressure according to a pulse width of said pulse signal.

6. An antiskid braking system as defined in claim 5, wherein said control means changes said control gain to be greater by increasing said pulse width of said pulse signal.

7. An antiskid braking system as defined in claim 1, wherein, when a vehicle speed at a time of commencement of braking detected by said brake sensor is lower than a specified speed, said control means changes said control gain to be greater in a low speed range of vehicle speeds less than a specified speed than in a high speed range of vehicle speeds greater than said specified speed.

8. An antiskid braking system as defined in claim 7, wherein said control means further calculates a slippage rate based on said wheel speed and said vehicle speed and causes a reduction of said hydraulic braking pressure in said antiskid braking control when said slippage rate is above a target slippage rate.

9. An antiskid braking system as defined in claim 8, wherein said control means changes said control gain to be greater by changing said target slippage rate to be lower.

10. An antiskid braking system as defined in claim 7, wherein said control means further includes an electronic valve which is operated with a pulse signal so as to regulate said hydraulic braking pressure according to a pulse width of said pulse signal.

11. An antiskid braking system as defined in claim 10, wherein said control means changes said control gain to be greater by increasing said pulse width of said pulse signal.

12. An antiskid braking system for performing antiskid braking control by periodically increasing and reducing hydraulic braking pressure according to a wheel speed during braking so as to control a vehicle going into a skid, said antiskid braking system comprising:

speed sensor means for detecting rotational speeds of wheels and presuming a vehicle speed based on said wheel speeds;

a brake sensor for detecting commencement of braking; and control means for performing said antiskid braking control at a control gain in a low speed range of vehicle speeds less than a specified speed, said control gain being greater when a vehicle speed at a time of commencement of said antiskid braking control detected by said brake sensor is low as compared to when a vehicle speed at said time is high.

13. An antiskid braking system as defined in claim 12, wherein said control means further calculates a slippage rate based on said wheel speed and said vehicle speed and causes a reduction of said hydraulic braking pressure in said antiskid braking control when said slippage rate is above a target slippage rate.

14. An antiskid braking system as defined in claim 13, wherein said control means changes said control gain to be greater by changing said target slippage rate to be lower.

15. An antiskid braking system as defined in claim 12, wherein said control means further includes an electronic valve which is operated with a pulse signal so as to regulate said hydraulic braking pressure according to a pulse width of said pulse signal.

16. An antiskid braking system as defined in claim 15, wherein said control means changes said control gain to be greater by increasing said pulse width of said pulse signal.

17. An antiskid braking system for performing antiskid braking control by periodically increasing and reducing hydraulic braking pressure according to a wheel speed during braking so as to control a vehicle going into a skid, said antiskid braking system comprising:

speed sensor means for detecting rotational speeds of wheels, presuming a vehicle speed based on said wheel speeds and calculating deceleration of said vehicle based on said vehicle speed during braking; and control means for performing said antiskid braking control at a control gain in a low speed range of vehicle speeds less than a specified speed, said control gain being greater when said deceleration is lower than a specified deceleration as compared to when said deceleration is higher than said specified deceleration.

18. An antiskid braking system as defined in claim 17, wherein said control means changes said control gain to be greater when said deceleration is lower than said specified deceleration and a vehicle speed at a time of commencement of said antiskid braking control is within said low speed range than when said deceleration is higher than said specified deceleration.

19. An antiskid braking system as defined in claim 18, wherein said control means further calculates a slippage rate based on said wheel speed and said vehicle speed and causes a reduction of said hydraulic braking pressure in said antiskid braking control when said slippage rate is above a target slippage rate.

20. An antiskid braking system as defined in claim 19, wherein said control means changes said control gain to be greater by changing said target slippage rate to be lower.

21. An antiskid braking system as defined in claim 18, wherein said control means further includes an electronic valve which is operated with a pulse signal so as to regulate said hydraulic braking pressure according to a pulse width of said pulse signal.

22. An antiskid braking system as defined in claim 21, wherein said control means changes said control gain to be greater by increasing said pulse width of said pulse signal.

23. An antiskid braking system for performing antiskid braking control by periodically increasing and reducing hydraulic braking pressure according to a wheel speed during braking so as to control a vehicle going into a skid, said antiskid braking system comprising:

speed sensor means for detecting rotational speeds of wheels and presuming a vehicle speed based on said wheel speeds;

load presuming means for presuming a load shifting to front wheels during braking; and control means for performing said antiskid braking control at a control gain which is greater in a low speed range of vehicle speeds less than a specified speed when a presumed load is low as compared to when said presumed load is high.

24. An antiskid braking system as defined in claim 23, and further comprising a brake sensor for detecting commencement of braking, wherein said load presuming means presumes said load based on a vehicle speed at a time of commencement of braking detected by said brake sensor.

25. An antiskid braking system as defined in claim 23, wherein speed sensor means further calculates deceleration of said vehicle based on said vehicle speed during braking and said load presuming means presumes said load based on deceleration of said vehicle during braking calculated by said speed sensor.

26. An antiskid braking system as defined in claim 23, wherein said load presuming means presumes said load based on a vehicle speed at a time of commencement of said antiskid braking control.

\* \* \* \* \*